United States Patent
Galanty et al.

(10) Patent No.: US 6,830,207 B2
(45) Date of Patent: *Dec. 14, 2004

(54) SCREEN CLEANING AND COMMINUTING SYSTEM

(75) Inventors: William B. Galanty, Short Hills, NJ (US); Alexander Vilensky, East Brunswick, NJ (US)

(73) Assignee: Franklin Miller, Inc., Livingston, NJ (US)

(*) Notice: Subject to any disclaimer, the term of this patent is extended or adjusted under 35 U.S.C. 154(b) by 161 days.

This patent is subject to a terminal disclaimer.

(21) Appl. No.: 10/266,890

(22) Filed: Oct. 8, 2002

(65) Prior Publication Data

US 2003/0085310 A1 May 8, 2003

Related U.S. Application Data

(63) Continuation-in-part of application No. 09/968,696, filed on Oct. 1, 2001, now abandoned, which is a continuation of application No. 09/498,855, filed on Feb. 7, 2000, now Pat. No. 6,311,905.

(51) Int. Cl.$^7$ .................................. B02C 1/08
(52) U.S. Cl. ................ 241/236; 241/73; 241/167; 209/389
(58) Field of Search .................. 241/68, 69, 73, 241/166, 167, 230, 231, 232, 233, 236; 209/384, 385, 387, 389; 210/173, 174

(56) References Cited

U.S. PATENT DOCUMENTS

| | | | |
|---|---|---|---|
| 2,672,985 A | 3/1954 | Nordell | |
| 4,166,583 A | * 9/1979 | Ruckstuhl | 241/73 |
| 4,637,557 A | * 1/1987 | Vitunac | 241/73 |
| 4,919,346 A | 4/1990 | Chambers, Sr. | |
| 4,966,689 A | * 10/1990 | Wark et al. | 209/384 |
| 5,061,380 A | 10/1991 | Stevenson | |
| 5,150,844 A | * 9/1992 | McKie | 241/73 |
| 5,320,286 A | 6/1994 | Chambers, Sr. et al. | |
| 5,490,922 A | 2/1996 | Gresa | |
| 5,505,388 A | 4/1996 | Chambers et al. | |
| 5,833,152 A | 11/1998 | Galanty | |
| 5,915,636 A | * 6/1999 | Caballero | 241/73 |
| 6,311,905 B1 | 11/2001 | Galanty et al. | |
| 6,330,982 B1 | * 12/2001 | Yu et al. | 241/73 |

* cited by examiner

Primary Examiner—Ed Tolan
(74) Attorney, Agent, or Firm—McCarter & English, LLP

(57) ABSTRACT

A comminuting apparatus including a filtering screen member for collecting solids carried by an effluent stream. The filtering screen member has an upstream side and a downstream side. The comminutor apparatus further includes a twin shaft grinder for grinding solids contained in the effluent stream and for cleaning the filtering screen member of solids collected thereon. The comminutor apparatus also includes a mounting member in the form of frame-like structure for mounting the twin shaft grinder at a spaced apart distance from the upstream side of the filtering screen member. Additionally, the comminutor apparatus includes a moving device in the form of a drive motor for moving the twin shaft grinder past the upstream side of the filtering screen member such that the twin shaft grinder is continuously spaced from the filtering screen member during the movement of the twin shaft grinder.

22 Claims, 19 Drawing Sheets

SCREEN CLEANING AND COMMINUTING SYSTEM

CROSS REFERENCE TO RELATED APPLICATIONS

This is a continuation-in-part of U.S. application Ser. No. 09/968,696, filed on Oct. 1, 2001, now abandoned which is a continuation of U.S. application Ser. No. 09/498,855, filed on Feb. 7, 2000, now U.S. Pat. No. 6,311,905 B1.

FIELD OF THE INVENTION

The present invention relates to a screen cleaning and comminuting system for sewage, wastewater and the like.

BACKGROUND OF THE INVENTION

The processing of sewage and wastewater involves high flow rates of sewage and wastewater debris through a channel in which the debris is comminuted. Typically, the comminution of sewage and wastewater debris can be achieved by using various different screening and shredding devices in combination, with such devices being positioned directly in the wastewater flow within the channel.

U.S. Pat. No. 5,490,922 discloses a sewage water installation that has a discharge basin in which is arranged a screening unit linked to a back-and-forth movable cleaning carriage. The mesh screen unit is depicted schematically and includes a plurality of parallel spaced bars forming the screen. A cleaning car, which moves back and forth, is allocated to the mesh screen. If the mesh screen is longer, several cleaning cars can be provided. A preferred cleaning car is provided with teeth designed to protrude between the bars of the screen so as to clean the spaces therebetween.

U.S. Pat. No. 2,672,985 discloses a transverse linear screen extending across an influent channel that intercepts all solids too large to pass therethrough. The screen consists of a plurality of parallel, U-shaped members, with the U-shaped portions extending towards the inflowing sewage, forming a series of slots in the screen. A comminuting unit is disposed in parallel spaced relationship and in close proximity with the screen surface to remove collected solid materials therefrom by means of a cutting cylinder having a rotatable shaft to which a plurality of cutting cylinders and combs are secured. As the comminuting unit travels back and forth along the width of a single linear screen by means of a direct drive motor in engagement with a rack device, the teeth project into the U-shaped portion of the slot members so as to remove solids intercepted by the screen.

In U.S. Pat. No. 5,833,152, a unitary comminuting system, adapted for wastewater channel use, is provided with devices, which include a single or dual semi-cylindrical-like sizing screen. Each screen has a circular rotating sweeping mechanism of interactive slotted comb bars or blades adapted to sweep and clear lodged or agglomerated solids adhering to the outer convex circumference surface of the screen. The screen is disposed in parallel spaced relationship with a twin-shaft comminuting device having two parallel shafts with teeth along the length thereof that rotate in opposite directions relative to one another. The unitary system of devices is positioned perpendicularly between the influent and effluent sides of the wastewater flow in a channel so that solids therein will encounter the convex surface of the semi-cylindrical like sizing screens or the twin shaft comminutor as the wastewater flows through the channel. Both the single or dual semi-cylindrical-like screen devices cause solids, which do not flow directly therethrough, to be cleared away from the outer convex surface of the sizing screen. The unitary system employs the separate rotating sweeping interactive blade mechanism into surrounding the wastewater flow, so as to cause and divert or direct the solids to flow toward or into the contiguous twin shaft comminuting device. This is aided by circulating wastewater currents generated in the wastewater flow near the entrance to the twin shaft comminutor. It is generated in part by the rotating sweeping interactive blades of the screening devices, whereupon the removed solids are channeled into the twin shaft shredder device along with the other wastewater and solids flow where they are reduced in particle size.

In U.S. Pat. No. 4,919,346, a moving mesh conveyor-screen allows flow to pass through, while it diverts the solids to an adjacent twin shaft grinder for reduction in a unitized system. The screen is, however, ineffective at transporting solids during low flow conditions, subject to plastering of solid debris against the mesh screen surface and breakage due to stretching caused by water pressure. In addition, the screen suffers from maintenance problems.

U.S. Pat. No. 5,505,388 is substantially identical to the '346 patent with the exception that the mesh-screen is wrapped around a sprocket to form a rotating drum-like member. Again, the rotating screen acts to allow flow to pass through while diverting oversized solids to the adjacent grinder. The operation can be inefficient and maintenance prone, because unreduced solids can bypass the grinder and pass downstream not masticated and because there are gaps between the rotating screen and the cutters through which a percentage of the solids pass unreduced. Further, solids become embedded in the rotating mesh drum-like screen and eventually get back-flushed downstream unprocessed. Maintenance problems result from the entrapment of solids within the central portion of the drum-like screen, requiring frequent cleaning. Also, the screen wears due to abrasion against bottom grit in the channel, while solids accumulating within the unit during power outages often require the unit to be manually cleared of debris before it can be restarted. Only approximately one quarter of the screen area is workable, as the part closest to the channel walls cannot effectively transport the solids, and the part in the back of the drum is not active. This results in a reduction in liquid-handling capacity.

U.S. Pat. No. 5,061,380 discloses another grinder-diverting system. It utilizes multiple parallel shafts with substantially parallel disks mounted thereupon, which intermesh one with another. The disks all rotate in a direction towards a vertically disposed grinder mounted to one side. The system uses an excessive amount of disks, drives and seal components; and, thus, it is extremely difficult to maintain. Solids, such as wood, can become lodged within the disks and present a blockage condition requiring manual removal.

None of the prior art systems described above is output controlled by any filtering device to assure a high percentage of reduction. They also suffer from components being mounted in the flow, which are subject to failure, wear, inefficient operation, seal failure, mechanical drive failure, etc. Many of the systems are crudely constructed, as well as being difficult and costly to install.

Accordingly, from a review of the foregoing prior art, it can be readily appreciated that it is desirable to provide a comminution system which is simple and cost effective in construction and having low maintenance requirements. The system should also be durable, efficient and effective as a comminutor.

Therefore, it is an object of the invention to avoid the shortcomings and deficiencies of the prior art devices described above.

It is another object of the invention to provide a comminution and screening system for reducing particle sizes in high flow applications.

Further, it is still another object of the invention to provide an effective and efficient self-cleaning screen and grinder system that can handle very high flow rates of sewage with low power requirements, minimal system parts for greater reliability and with a higher level of solids processing.

SUMMARY OF THE INVENTION

In accordance with the present invention, there is provided a comminutor apparatus having a filtering screen member with an upstream side for collecting solids carried by an effluent stream. The comminutor apparatus further includes a twin shaft grinder for grinding solids contained in the effluent stream and for cleaning the filtering screen member of solids collected thereon. The comminutor apparatus also includes a mounting member in the form of a frame-like structure for mounting the twin shaft grinder at a spaced distance from the upstream side of the filtering screen member. Additionally, the comminutor apparatus includes a moving device in the form of a drive motor for moving the twin shaft grinder past the upstream side of the filtering screen member such that the twin shaft grinder is continuously spaced from the filtering screen member during the movement of the twin shaft grinder. One embodiment of the invention includes an auger screen assembly being placed in cooperation with the twin shaft grinders to remove solid matter passing through the twin shaft grinders.

BRIEF DESCRIPTION OF THE DRAWINGS

Further objects, features and advantages of the present invention will become apparent upon consideration of the following detailed description of various exemplary embodiments considered in conjunction with the accompanying drawings, in which.

DETAILED DESCRIPTION OF THE EXEMPLARY EMBODIMENTS

Figure 1:
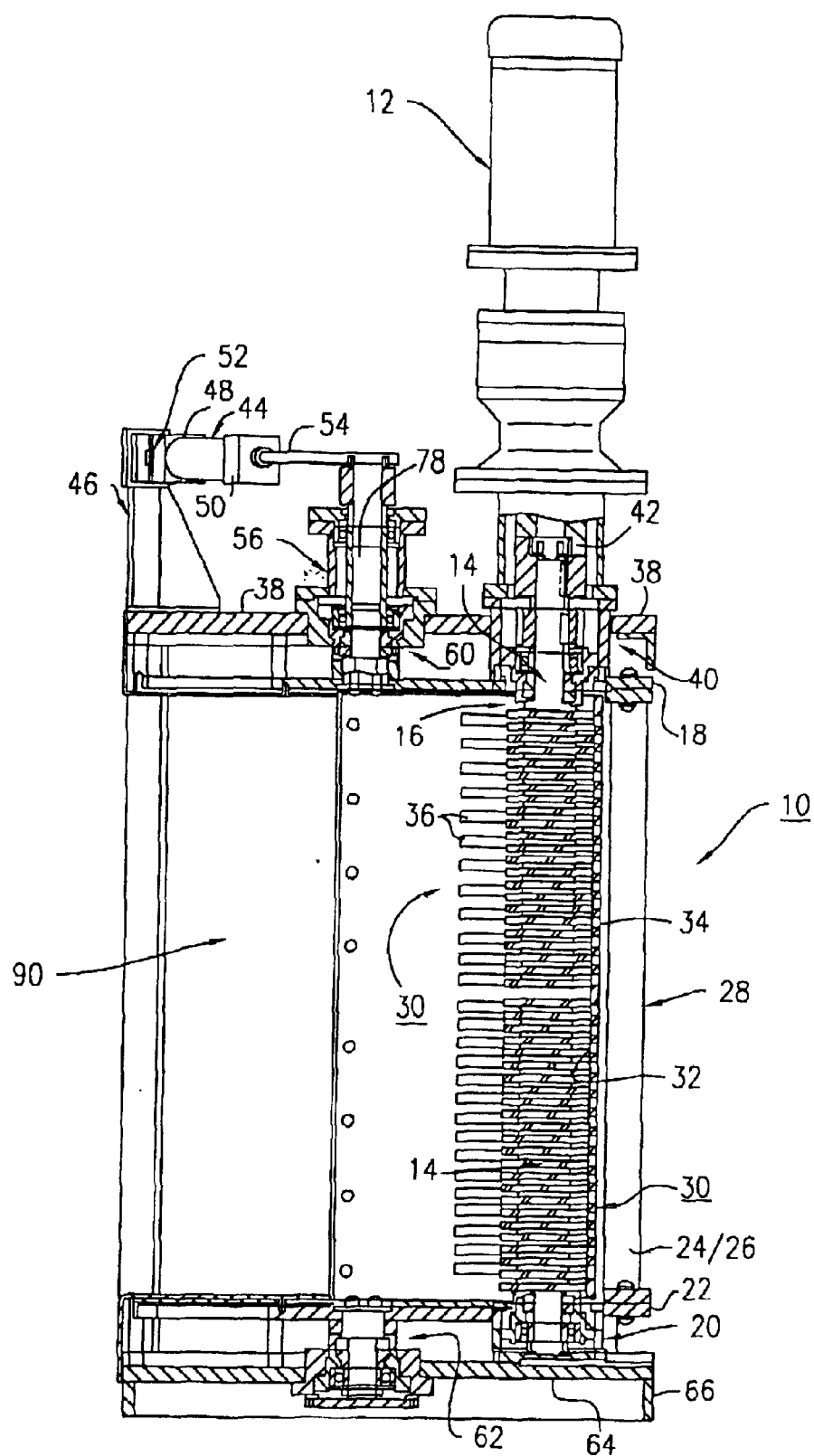
FIG. 1 is a partial cross-sectional view of a twin-shaft comminutor constructed in accordance with one exemplary embodiment of the present invention, the cross-section having been taken along a longitudinal axis of the comminutor.

Referring initially to FIG. 1, there is shown a screen cleaning and comminution system (twin-shaft comminutor) 10, which includes a hydraulic drive motor 12 operatively connected to a twin-shaft grinder 14. The twin-shaft grinder 14 is supported by an upper grinder bearing device 16 connected to an upper horizontal support plate 18. The twin-shaft grinder 14 is also supported by a lower grinder bearing device 20 connected to a lower horizontal support plate 22. The upper and lower horizontal support plates 18 and 22 are connected to a pair of parallel, vertical by extending support members 24 and 26 to form a rectangularly-shaped frame-like structure 28. This frame-like structure 28 adds stiffness and rigidity to the arrangement of the major components such that the twin-shaft grinder 14 is held fixedly and rigidly in place with respect to the other component parts of the twin-shaft comminutor 10. The twin-shaft grinder 14 can be removably detached from the frame-like structure 28 as a unit for ease of repair.

Figure 2:
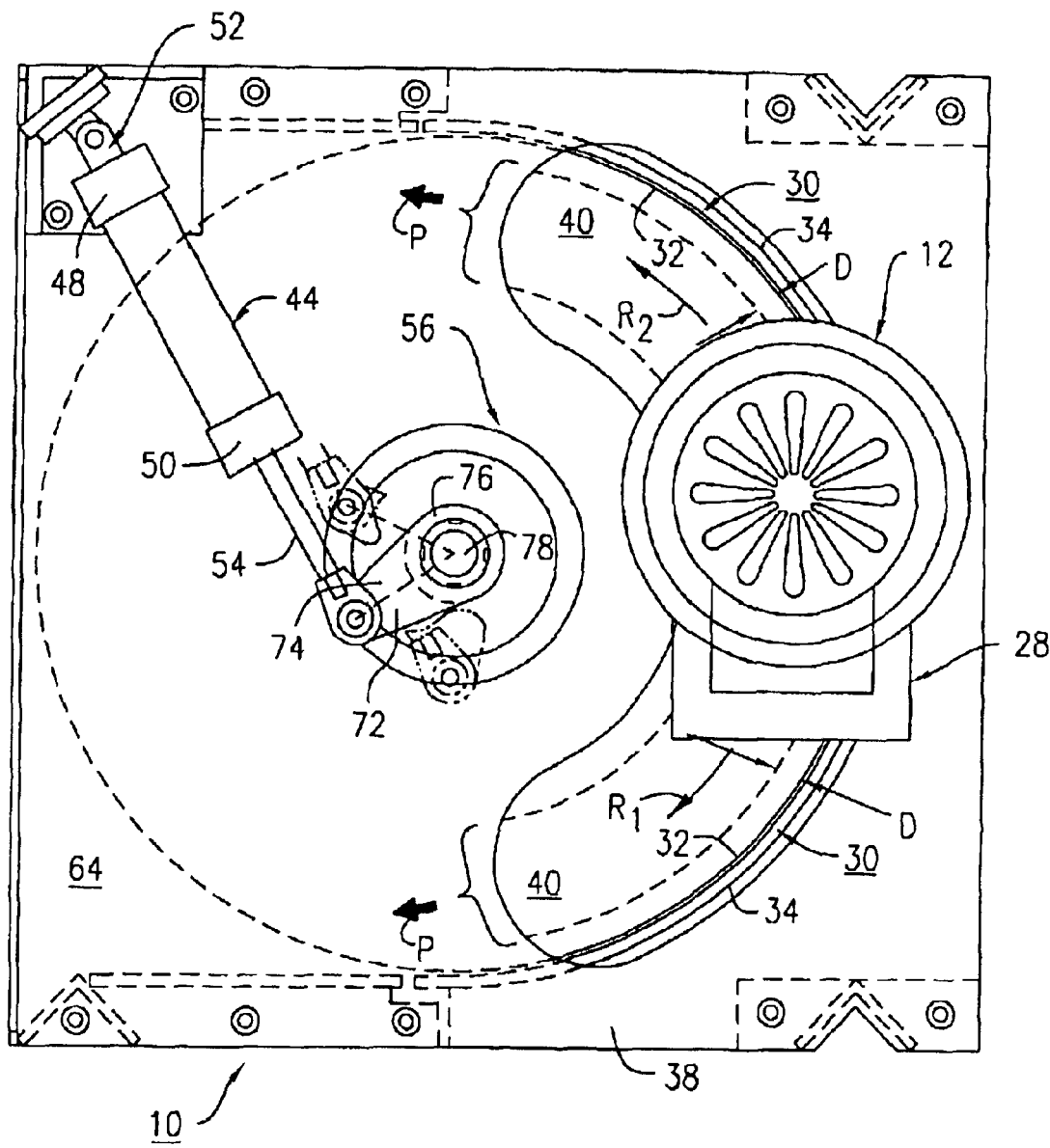
FIG. 2 is a top plan view of the twin-shaft comminutor of FIG. 1.

Still referring to FIG. 1, the twin-shaft comminutor 10 further includes a filtering screen member 30 for screening and collecting solids carried by an effluent stream. The effluent stream is defined as a stream carrying waste water or other liquids. The screen member 30 is flanked by the vertical support members 24 and 26, on one side, and by the twin-shaft grinder 14, on an opposite side, while the upper and lower horizontal support members 18 and 22 flank opposite ends of the screen member 30. The screen member 30 includes an upstream surface 32 and a downstream surface 34, with the twin-shaft grinder 14 being disposed along a predetermined path P a distance D from the upstream surface 32 of the screen member 30, as depicted in FIG. 2. The filtering screen member 30 may have a plurality of openings 36 therein. Since the grinder unit 14 does not contact or penetrate the openings 36 in the screen member 30, the openings 36 may have a wide variety of configurations and designs (see, for instance, FIGS. 4a through 4i, which will be described hereinafter).

Figure 4A:
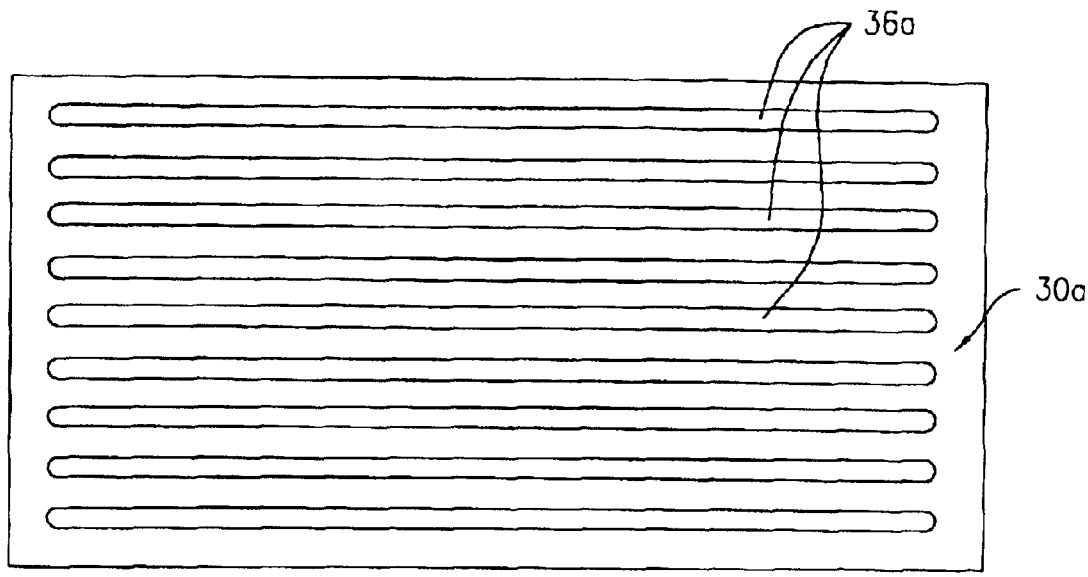
FIGS. 4a to 4i are front elevational views of various filtering screen members, each one having a different slot configuration.
Figure 4B:
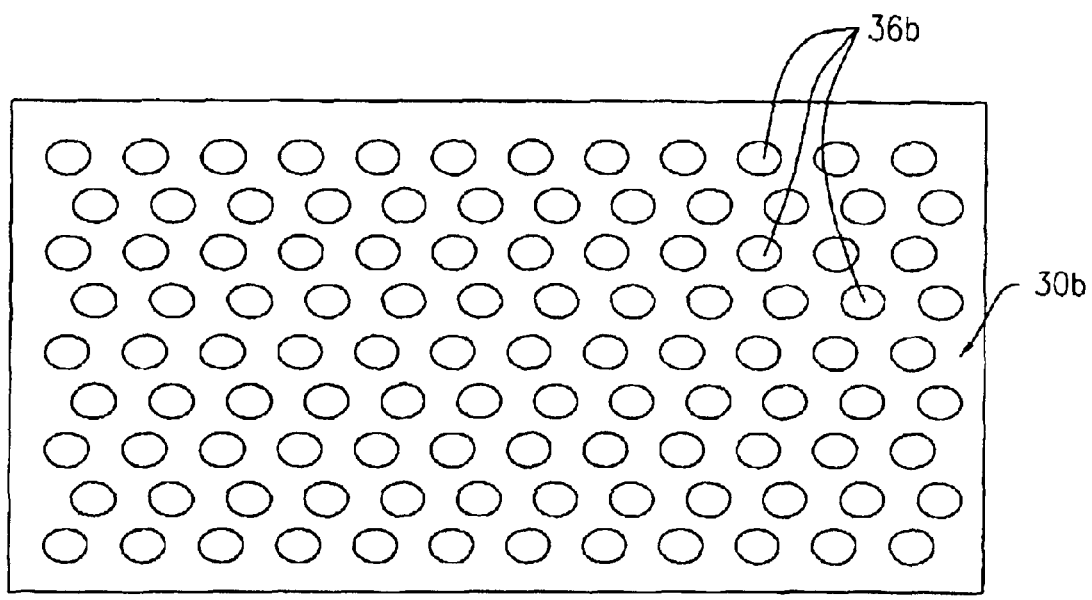
Figure 4C:
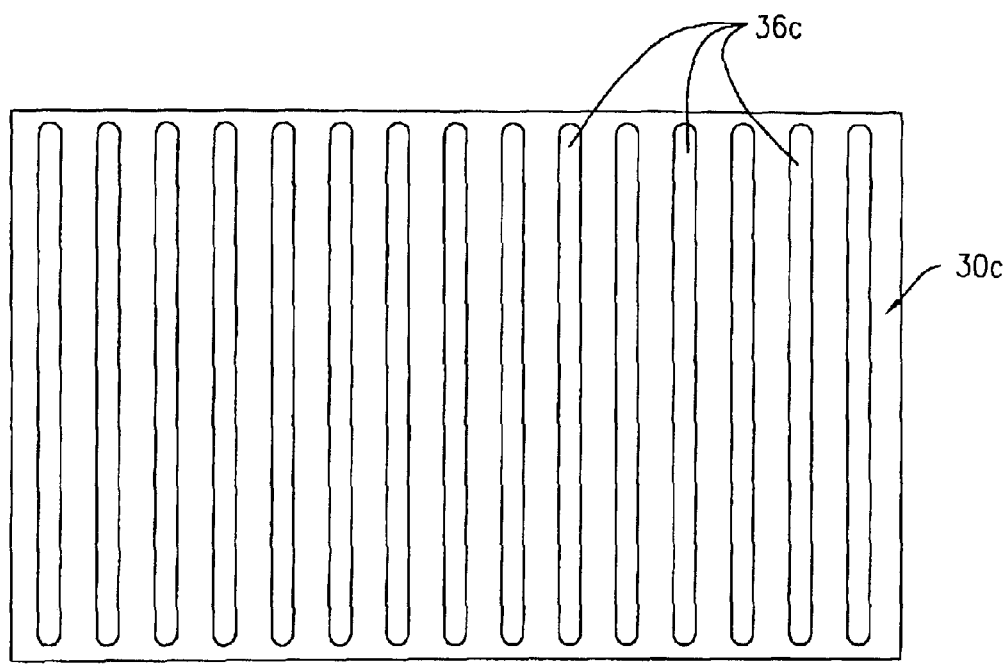
Figure 4D:
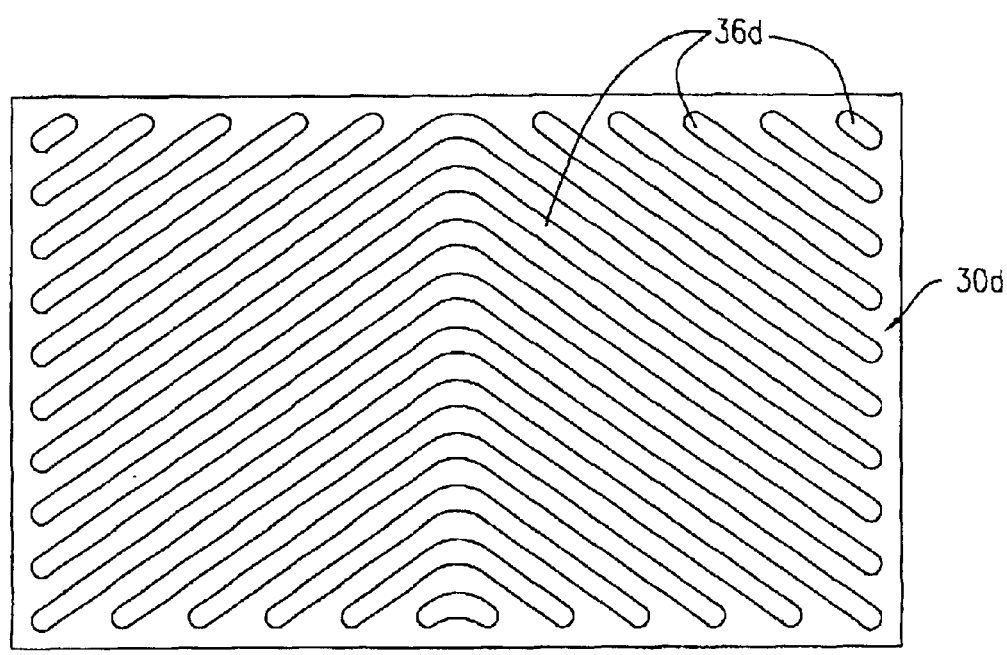
Figure 4E:
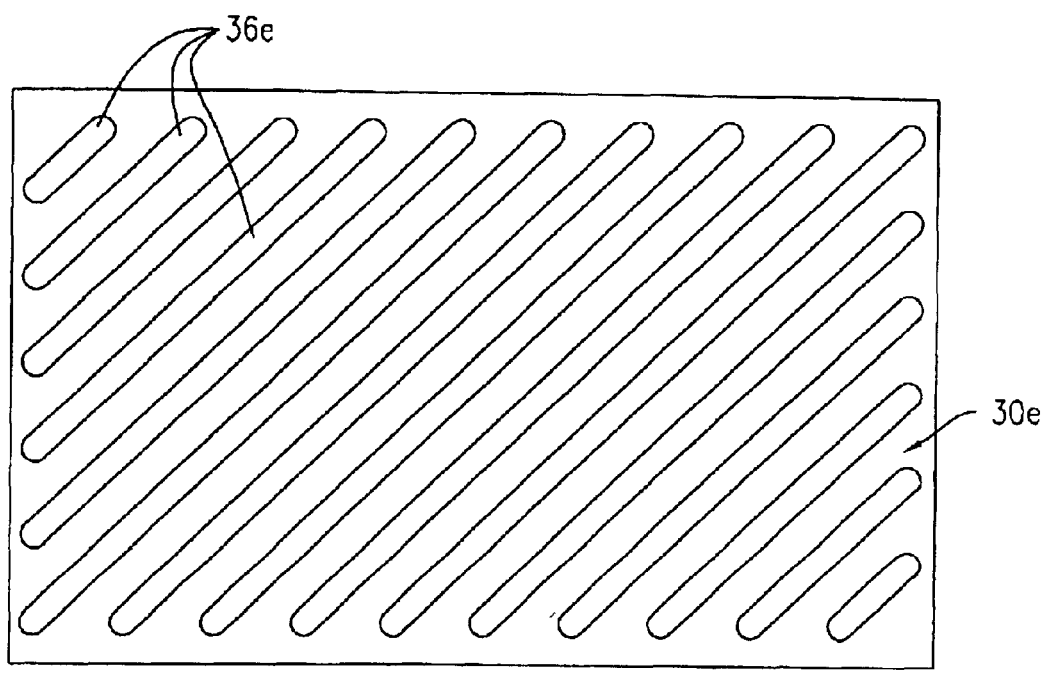
Figure 4F:
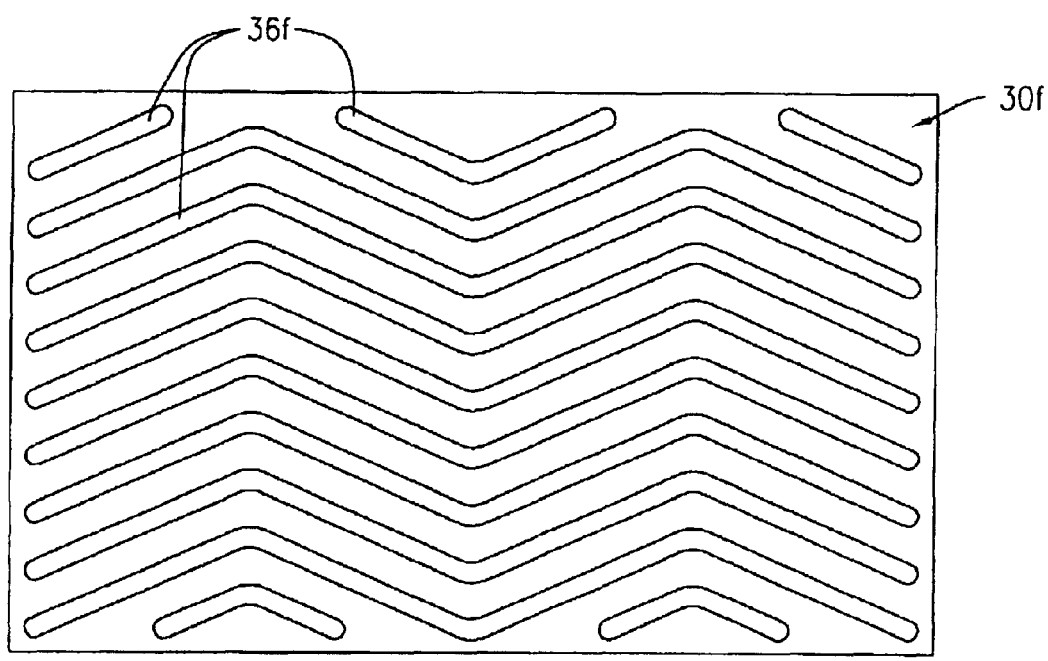
Figure 4G:
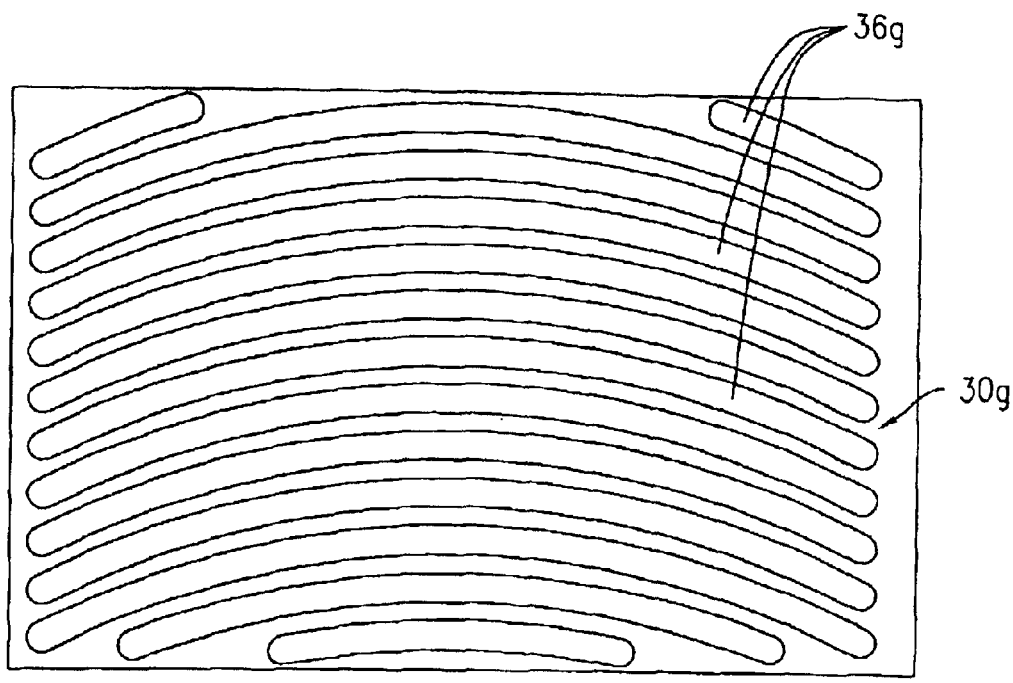
Figure 4H:
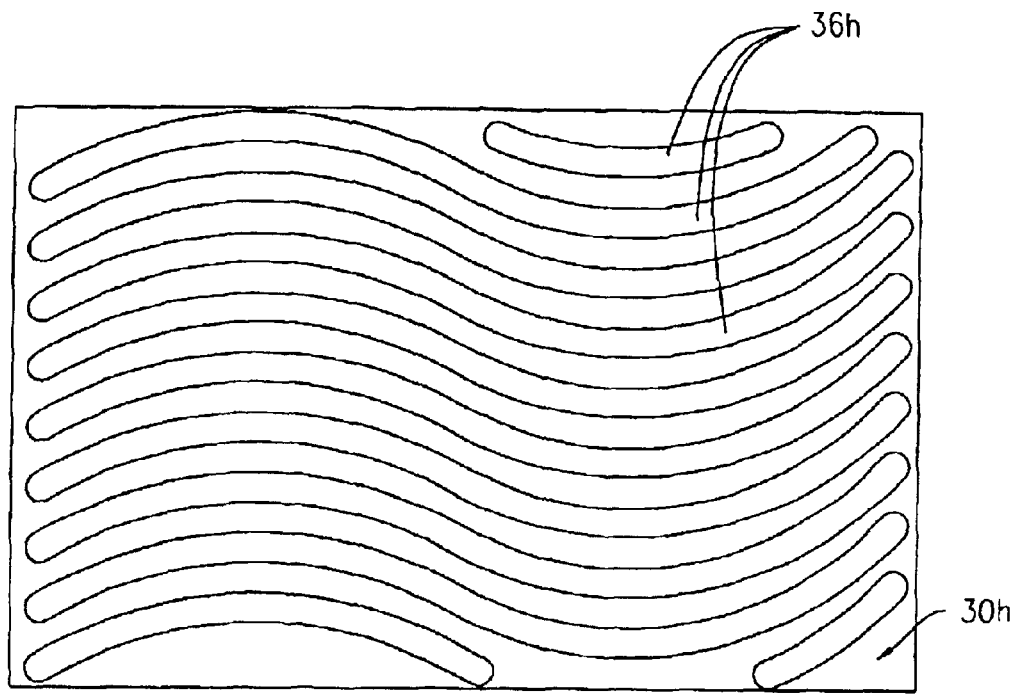
Figure 4I:
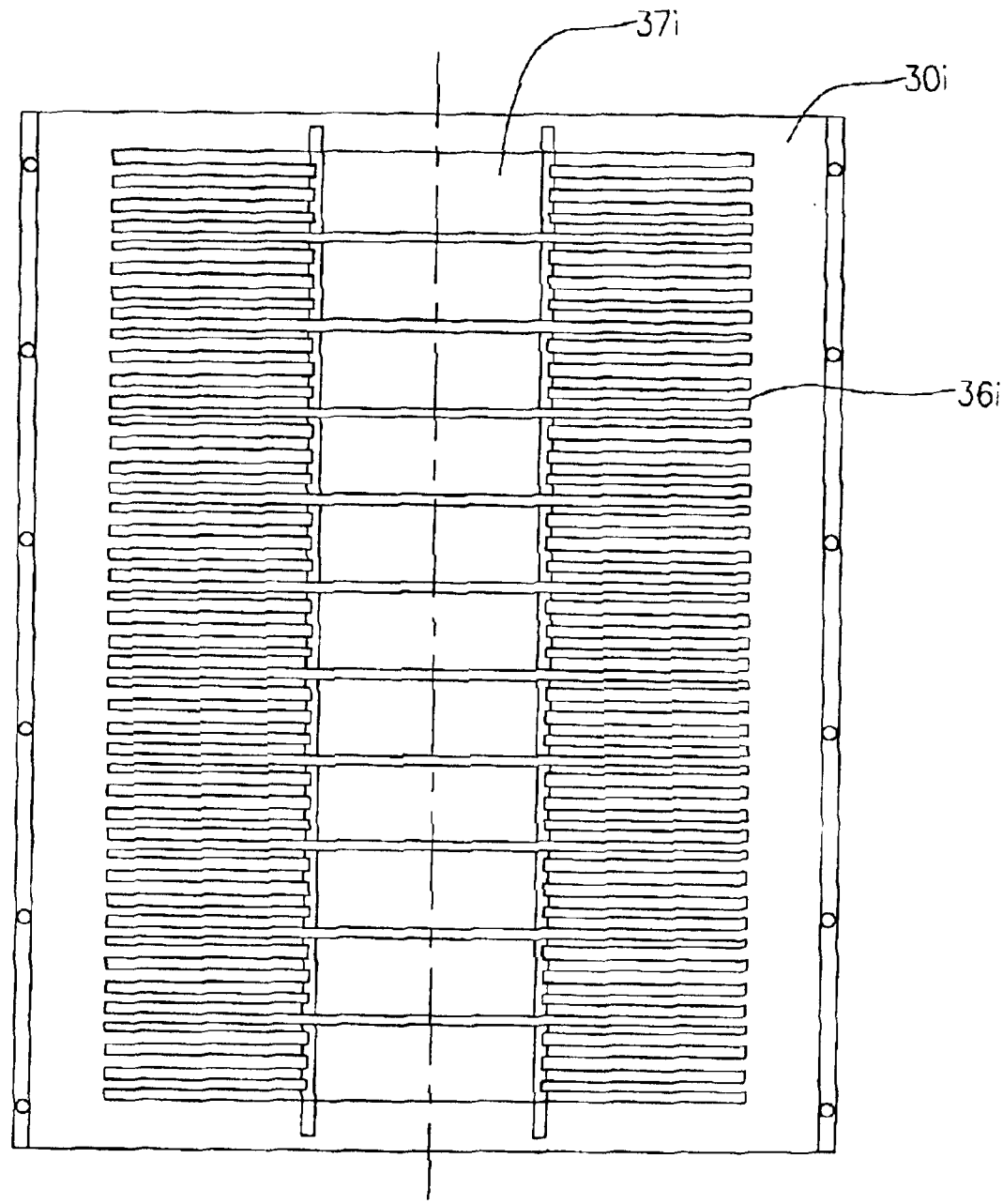

For example, as shown in FIG. 4a, screen member 30a includes a plurality of elongated slotted channels 36a being horizontally aligned. As shown in FIG. 4b, screen member 30b includes a plurality of circular-shaped openings 36b being arranged in columns and rows. Referring to FIG. 4c, screen member 30c includes a plurality of elongated slotted channels 36c being vertically aligned. Referring now to FIG. 4d, screen member 30d includes a plurality of chevron-shaped slotted channels 36d being horizontally aligned. In reference to FIG. 4e, screen member 30e includes a plurality of elongated slotted channels 36e being diagonally aligned. As shown in FIG. 4f, screen member 30f includes a plurality of saw-toothed slotted channels 36f being horizontally aligned. In reference to FIG. 4g, screen member 30g includes a plurality of curved slotted channels 36g being horizontally aligned. In reference to FIG. 4h, screen member 30h includes a plurality of sinusoidally-shaped slotted channels 36h being horizontally aligned. In reference to FIG. 4i, screen member 30i includes a plurality of slotted channels 36i being horizontally aligned with one another. Also disposed through the screen member 30i are a plurality of rectangular shaped apertures 37i. The rectangular shaped apertures 37i are aligned along a center longitudinal axis of the screen member 30i.

Referring now to FIGS. 1 and 2, the twin shaft comminutor 10 also includes an upper horizontal cover plate 38 having an arcuate-like opening 40 therein, through which the hydraulic drive motor 12 extends for connection to an upper end portion 42 of the twin shaft grinder 14. Additionally, the twin shaft comminutor 10 includes a hydraulic cylinder device 44 connected to a frame member 46. The hydraulic cylinder device 44 includes a rear end 48 and a front end 50. The rear end 48 of hydraulic cylinder device 44 is attached to a swivel-linking arrangement 52 for swiveling the hydraulic cylinder device 44 in an arc-like pattern. The front end 50 of the hydraulic cylinder device 44 includes a piston member 54 extending therefrom. The piston member 54 is connected and linked to a reciprocating device 56 in which to reciprocate and move the reciprocating device 56 in an arc-like motion along the path P as previously described in the above. The reciprocating device 56 is connected to and supported by the upper horizontal cover plate 38. The reciprocating device 56 is also supported by an upper reciprocator bearing unit 60 and a lower bearing unit 62, as well as being supported by the frame-like structure 28 described above. Additionally, the lower reciprocator bearing device 62 is connected to the lower support plate 22, and the lower support plate is further connected to and supported by a lower frame member 64. The lower frame member 64 is connected to a bottom base support member 66 upon which all of the major components of the twin shaft comminutor apparatus 10 resides.

Figure 3:
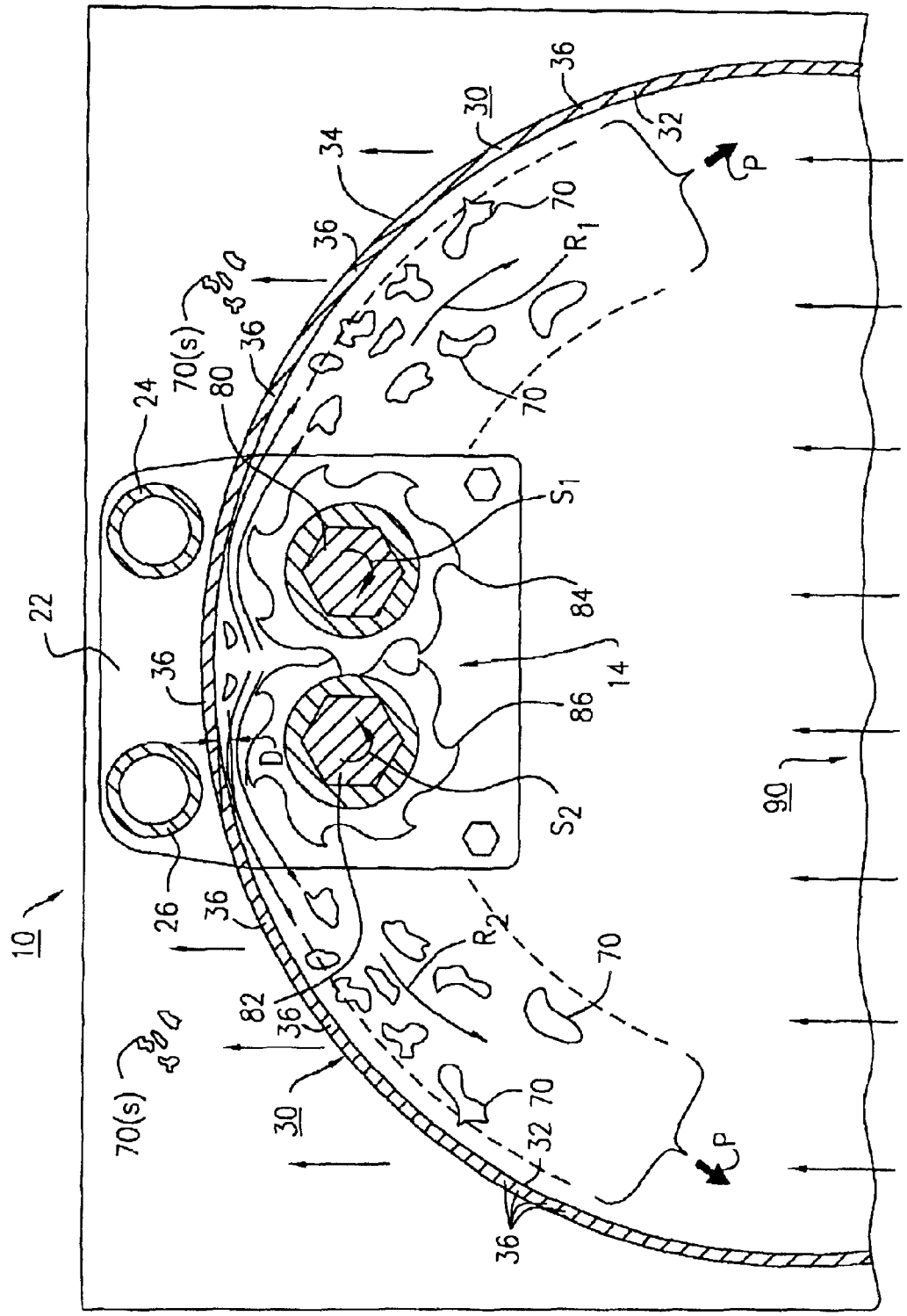
FIG. 3 is a partial schematic view of the twin-shaft comminutor of FIG. 1 showing the relative relationship of a pair of grinders to a filtering screen having a fluid flow therethrough.

By connecting the reciprocating device 56 to the rectangularly-shaped frame-like structure, as shown in FIGS. 1 to 3, it is possible to concurrently move the drive motor 12, the twin shaft grinder 14, and the parallel pair of support members 24 and 26, along the arcuate path P in a reciprocating motion indicated by the curved arrows $R_1$ and $R_2$ through the arcuate-like opening 40. The twin shaft grinder 14 is held in a fixed and rigid spaced distance D relationship to the upstream side surface 32 of screen member 30, as the combination of elements 14, 24 and 26 sweep and move back and forth along the concave upstream side surface 32 of screen member 30, so as to sweep and remove any larger solid particles 70 contained on the upstream side surface 32 of screen member 30.

With particular reference to FIG. 2, the reciprocating device 56 includes a crank arm 72 connected at one end 74 to the piston member 54 and an opposite end 76 to a shaft 78 of the reciprocating device 56. Thus, the crank arm 72 in combination with the piston member 54 of the hydraulic cylinder device 44 is connected at this other end 76 in a linking or swiveling manner such that the twin shaft grinder 14 is moved and reciprocated in a back and forth manner through the arcuate opening 40 along the arcuate path P indicated by the curved arrows $R_1$ and $R_2$. The twin shaft grinder 14 is in close proximity (see FIGS. 2 and 3) at a predetermined spaced distance D to the upstream side surface 32 of the concave screen member 30. The twin shaft grinder 14 is not shown in FIG. 2 as it is hidden from view by the hydraulic drive motor 12. The hydraulic cylinder device 44 is actuated by a typical hydraulic system arrangement known in the prior art and in the interest of brevity is not shown here. Since drive motor 12 is a hydraulic motor, it will also be activated by a similar conventional hydraulic system and is also not shown.

With reference to FIG. 3, the twin shaft grinder 14 includes a pair of parallel rotatable shafts 80, 82 and a pair of intermeshing grinder teeth members 84, 86 disposed on the shafts 80, 82, respectively, for rotation concurrently therewith. As shown in FIG. 3, each of the shafts 80, 82 rotate in an opposite direction relative to one another as indicated by the curved arrows $S_1$ and $S_2$ As also shown in FIG. 3, solid material particles 70 within the upstream side of the effluent stream are pushed in opposite directions on either side of the twin shaft grinder 14, such that the concave upstream surface 32 of screen member 30 is swept clean of the particles 70. This sweeping action (as represented by arrows $R_1$ and $R_2$) is a result of the grinder 14 passing close enough to make contact with the solid particles 70, but not so close to the screen member 30 that the grinder teeth members 84, 86 touch the upstream surface 32 of the screen member 30. It is noted that the removal of the solid particles 70 from the upstream surface 32 of the screen member 30 is the result, at least partially, of the grinder teeth members 84, 86 contacting the solid particles 70 so as to remove them from the screen member 30. This ploughing action itself may not be sufficient to remove all of the solid particles 70 from the screen member 30 due to the spacing D maintained between the upstream surface 32 and the grinder teeth members 84, 86. The rotary and reciprocating motion of the twin-shaft grinder 14 generates significant fluid motion near the upstream surface 32 of the screen member 30, thereby entraining virtually all of the solid particles 70 remaining on the screen member 30, as well as those previously removed therefrom as described above. It is further noted that the solid particles 70 which are entrained will be recirculated to a position directly upstream from the twin-shaft grinder 14, where the mixing beater like flow created by the counter-rotating drive shafts 80, 82 and their respective grinder teeth members 84, 86 will cause the entrained particles to pass through the twin shaft grinder 14 for shredding.

In operation, the twin shaft grinder 14 of the comminutor apparatus 10 operates in the following manner. An in-flow of solid particles 70 from the effluent stream are received within a front opening area 90 of the comminutor apparatus 10, as shown in FIG. 3, wherein these solid material particles 70 impact upon the rotating cutting and grinding teeth members 84, 86, and are shredded into small or minute particles 70s. These small shredded particles 70s flow freely through the plurality of openings 36 of screen member 30 such that the small shredded particles 70s are discharged from the downstream surface 34 of screen member 30, as depicted in FIG. 3. It is understood that the two drive shafts 80, 82 of grinder 14 whose lengths extend to essentially the full depth of the effluent stream within a channel where these shafts 80, 82 rotate in opposite motions relative to one another, as indicated by the curved arrows $S_1$ and $S_2$ It should be noted that the twin shaft grinder 14 of the comminutor apparatus 10 of the first exemplary embodiment of the present invention has two novel functions, that it operates as: (1) a grinder unit for sizing solids while simultaneously operates as (2) a sweeper unit to remove solid material particles 70 from the upstream side surface 32 of the filtering screen member 30 without making any physical contact with the screen member 30 therewith.

Second Exemplary Embodiment

Figure 5:
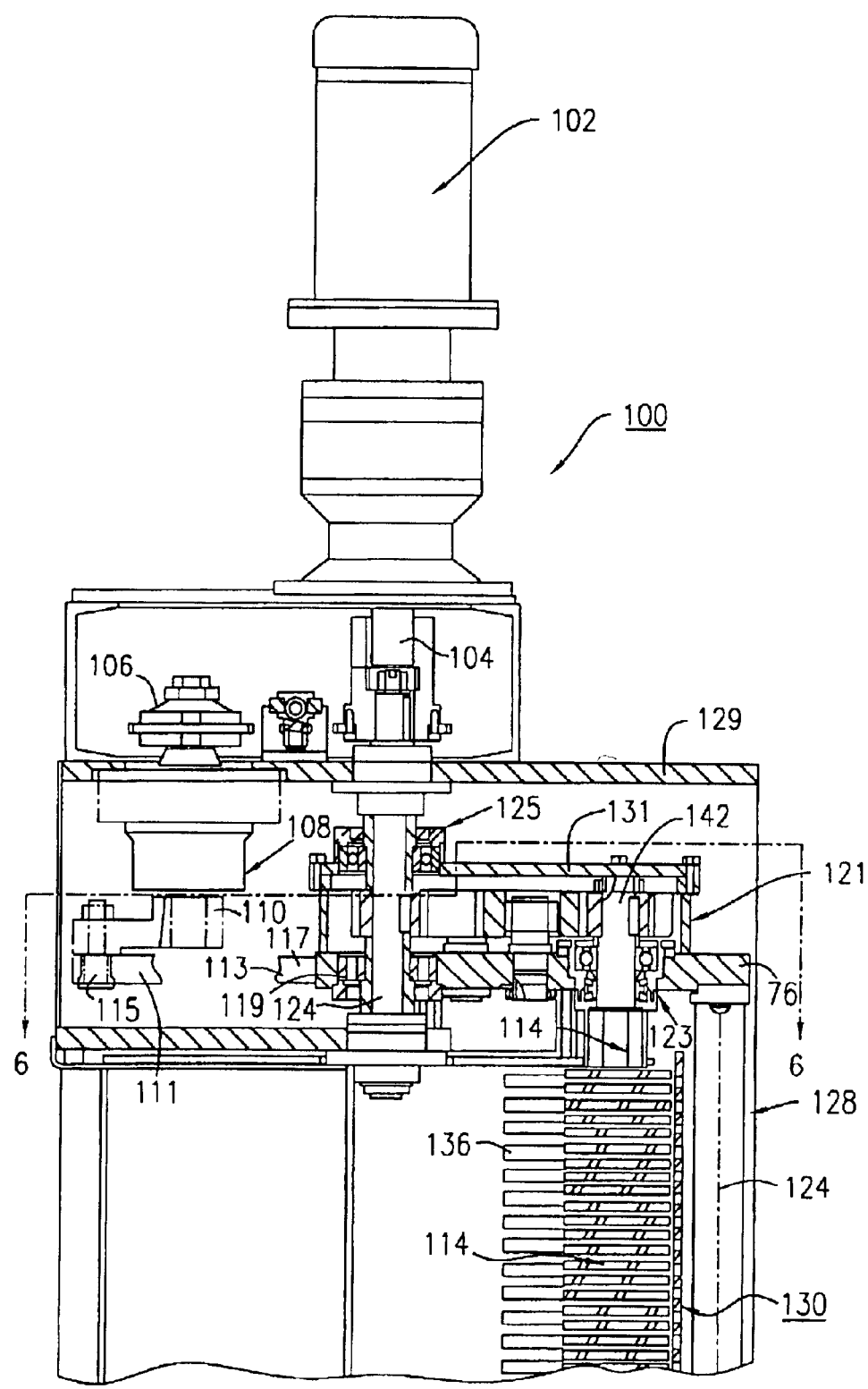
FIG. 5 is a partial longitudinal, cross-sectional view of an upper portion of a twin-shaft comminutor constructed in accordance with another exemplary embodiment of the present invention.
Figure 6:
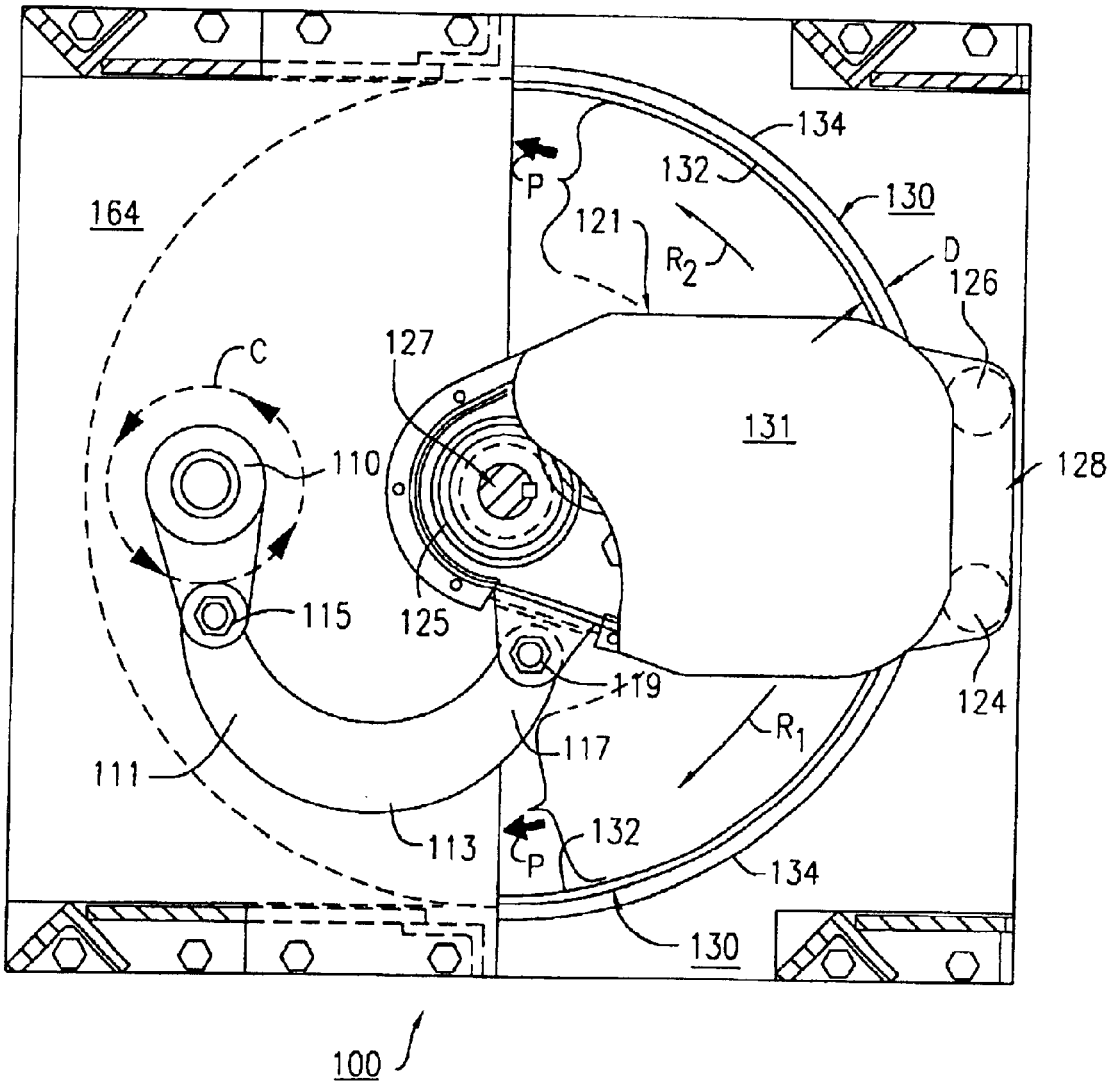
FIG. 6 is a cross-sectional view, taken along section line 6—6 and looking in the direction of the arrows, of the twin-shaft comminutor of FIG. 5.

A second exemplary embodiment 100 of the present invention is illustrated in FIGS. 5 and 6. Elements illustrated in FIGS. 5 and 6 which correspond to the elements described above with reference to FIGS. 1 to 3 have been designated by corresponding reference numbers increased by 100. The embodiment of FIGS. 5 and 6 is constructed and operates in the same manner as the embodiment of FIGS. 1 to 3, unless it is otherwise stated.

Referring to FIGS. 5 and 6, a twin-shaft comminutor 100 includes a single fixed drive means in the form of an electric drive motor 102 for driving a twin shaft grinder 114 to grind and shred solid material particles 170 in the effluent stream and for moving the twin shaft grinder 114 in a reciprocating manner, as shown by arrows $R_1$ and $R_2$ Except for the use of the electric drive motor 102 as a replacement for the hydraulic drive motor 12, the construction of the comminutor 100 is essentially the same as that for the comminutor 10. Accordingly, as shown in FIG. 5, the lower portion of the comminutor 100 has been omitted in the interest of brevity since its construction is essentially the same as the lower portion of the comminutor 10, shown in FIG. 1.

Referring now to FIG. 5, the electric drive motor 102 includes a shaft member 104 that can be linked to a coupling device 106 by coupling means in the form of a chain, belt or gear arrangements. The coupling device 106 is connected to a speed reducing device 108, which is connected, in turn, to a crank-like linking device 110. The crank-like linking device 110 is then connected to a first end 111 of a reciprocal motion control arm 113 via a first linking swivel joint connection 115. The other end 117 of the control arm 113 is connected to a second linking swivel joint connection 119, which is, in turn, connected to a grinder driver device 121 for driving the twin shaft grinder 114. The grinder driver device 121 includes a bearing member 123 for supporting an upper end portion 142 of the twin shaft grinder 114. The grinder driver device 121 also includes a support cover member 131 for covering the driver device 121 and for supporting a bearing device 125, which is used with a coupling shaft 127 of the electric drive motor 102. The electric drive motor 102 and the coupling device 106 are supported by an upper horizontal support plate 129.

Referring still to FIG. 5, the grinder driver device 121 functions to (1) rotate the twin shaft grinder 114 in order to shred and grind the solid particles 170 in the effluent stream and (2) reciprocate the twin shaft grinder 114 in a back and forth motion as indicated by arrows $R_1$ and $R_2$ along the arcuate path P at the spaced distance D from an upstream surface 132 of screen member 130. The reciprocating motion described above is accomplished through the use of the crank-like linking device 110 and the reciprocal motion control arm 113. As shown in FIG. 6, the crank-like linking device 110 is connected to the first end 111 of the reciprocal motion control arm 113, while the second end 117 of the control arm 113 is connected to the second swivel joint connection 119, which is rotatably connected to the grinder driver device 121. Because the grinder driver device 121 is partially covered by the cover plate 131, only the coupling shaft 127 of the single electric drive motor 102 is visible in FIG. 6.

The coupling shaft 127 is the axis about which the grinder driver device 121 pivots as it moves the twin shaft grinder 114 back and forth in the reciprocating fashion described above adjacent to the concave upstream surface 132 of screen member 130. The parallel support members 124,126 can also be seen as part of a rectangularly-shaped frame structure 128. A broken-line circle with the arrow heads designated by the reference letter C illustrates the direction of rotation of the crank-like linking device 110 (see FIG. 6), which moves the driver device 121 back and forth along the arcuate path P indicated by the curved arrows $R_1$ and $R_2$.

The operation of the twin-shaft comminutor apparatus 100 is essentially the same as described above in connection with the operation of the twin-shaft comminutor apparatus 10. The primary difference between the operation of these two embodiments is the structural mechanism for rotating the twin-shaft grinders 114 and 14 and for moving the twin shaft grinders 114 and 14 in a reciprocating motion relative to the upstream side surfaces 132 and 32 of screen members 130 and 30, respectively. As shown in FIGS. 5 and 6, the comminutor apparatus 100 employs a single electric drive motor 102 which is operatively connected to associated couplings means to provide both rotational motion for the twin shaft grinder 114 and reciprocating motion to move the grinder 114 along an arcuate path P at a spaced distance D adjacent to the concave upstream side surface 132 of the screen member 130. The comminutor apparatus 10, as shown in FIGS. 1 and 2, depicts two hydraulically driven motors 12 and 56, wherein the hydraulic drive motor 12 provides the rotational motion for the twin-shaft grinder 14 and the reciprocating moving device 56 provides the reciprocating motion to move the twin shaft grinder 14 along an arcuate path P at a spaced distance D adjacent to the concave upstream side surface 32 of the screen member 30.

Third Exemplary Embodiment

A third exemplary embodiment of the present invention is illustrated in FIGS. 7 to 10. Elements illustrated in FIGS. 7 to 10 which correspond to the elements described above with reference to FIGS. 1 to 3 have been designated by corresponding reference numbers increased by two hundred. The embodiment of FIGS. 7 to 10 is constructed and operates in the same manner as the embodiment of FIGS. 1 to 3, unless it is otherwise stated.

The comminutor 200 includes a dual electric drive system 201 having a center oscillating drive motor 203 and a grinder electric drive motor 205. The center oscillating drive motor 203 provides the reciprocating motion to move the grinder electric drive motor 205 and its attached grinder 214 along the arcuate path P at a spaced distance D adjacent to a concave upstream side surface 232 of screen member 230. The grinder electric drive motor 205 provides the rotational motion for the twin shaft grinder 214 for grinding and shredding of the solid material particles 270 in the upstream liquid flow of the effluent stream (see FIG. 8). The dual electric drive system 201 is supported by a rectangularly-shaped frame-like structure 228 (see FIG. 9). The center oscillating motor 203 includes a high ratio reduction gear 207 for use with the twin shaft grinder 214 in order to generate travel at a low speed along the arcuate path P adjacent to the screen member 230, as shown in FIGS. 8 and 10.

Figure 7:
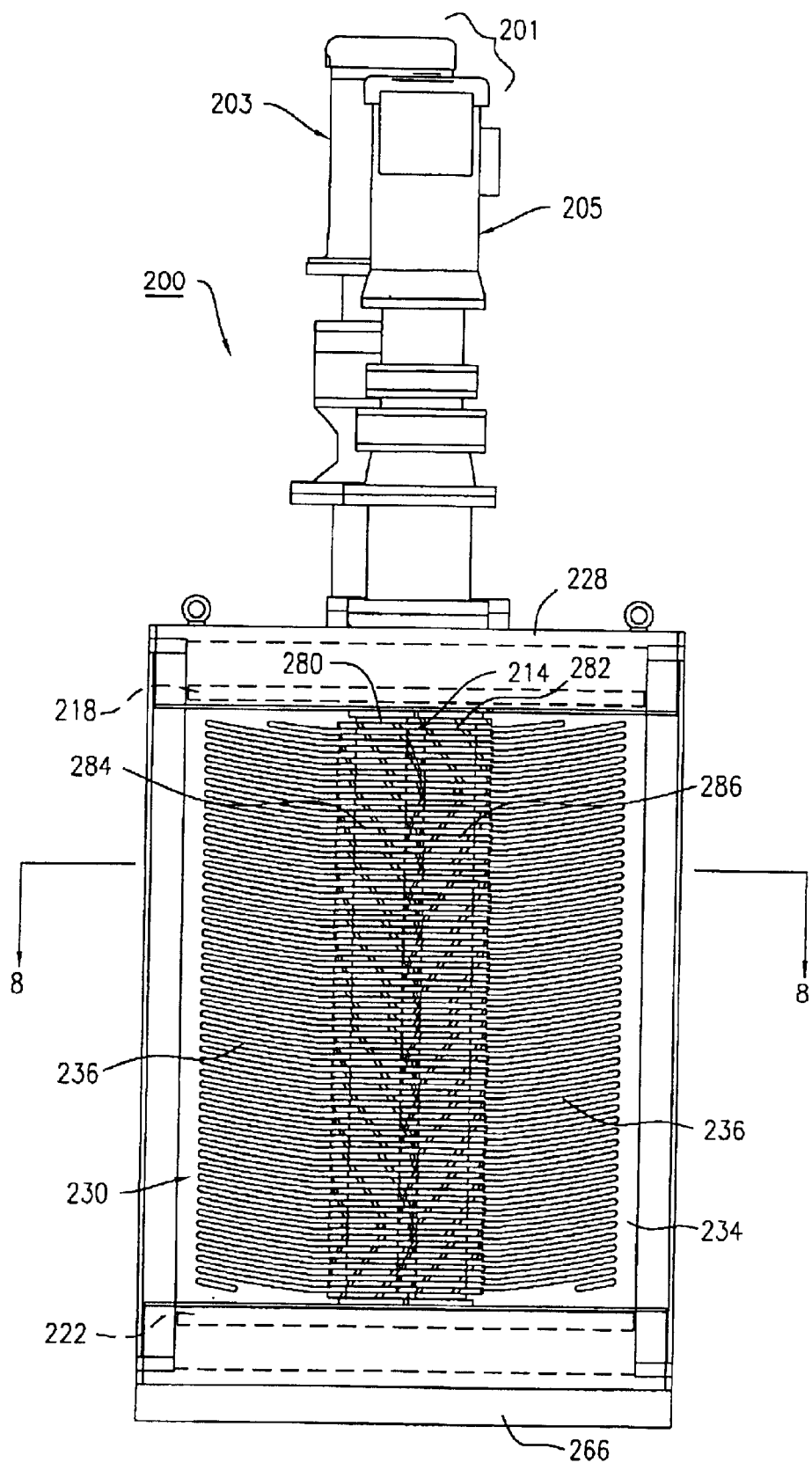
FIG. 7 is a front elevational view of a twin-shaft comminutor constructed in accordance with yet another exemplary embodiment of the present invention.
Figure 8:
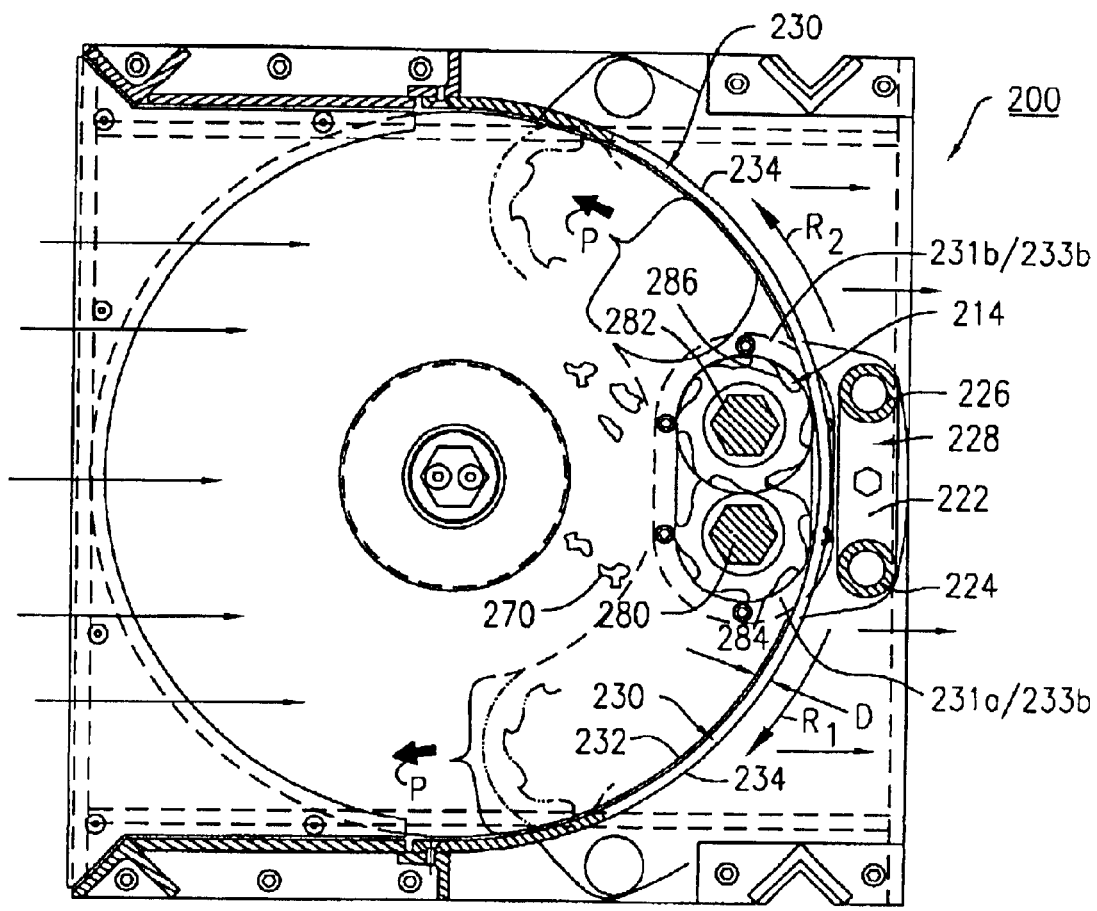
FIG. 8 is a cross-sectional view, taken along section line 8—8 and looking in the direction of the arrows, of the twin-shaft comminutor of FIG. 7.
Figure 9:
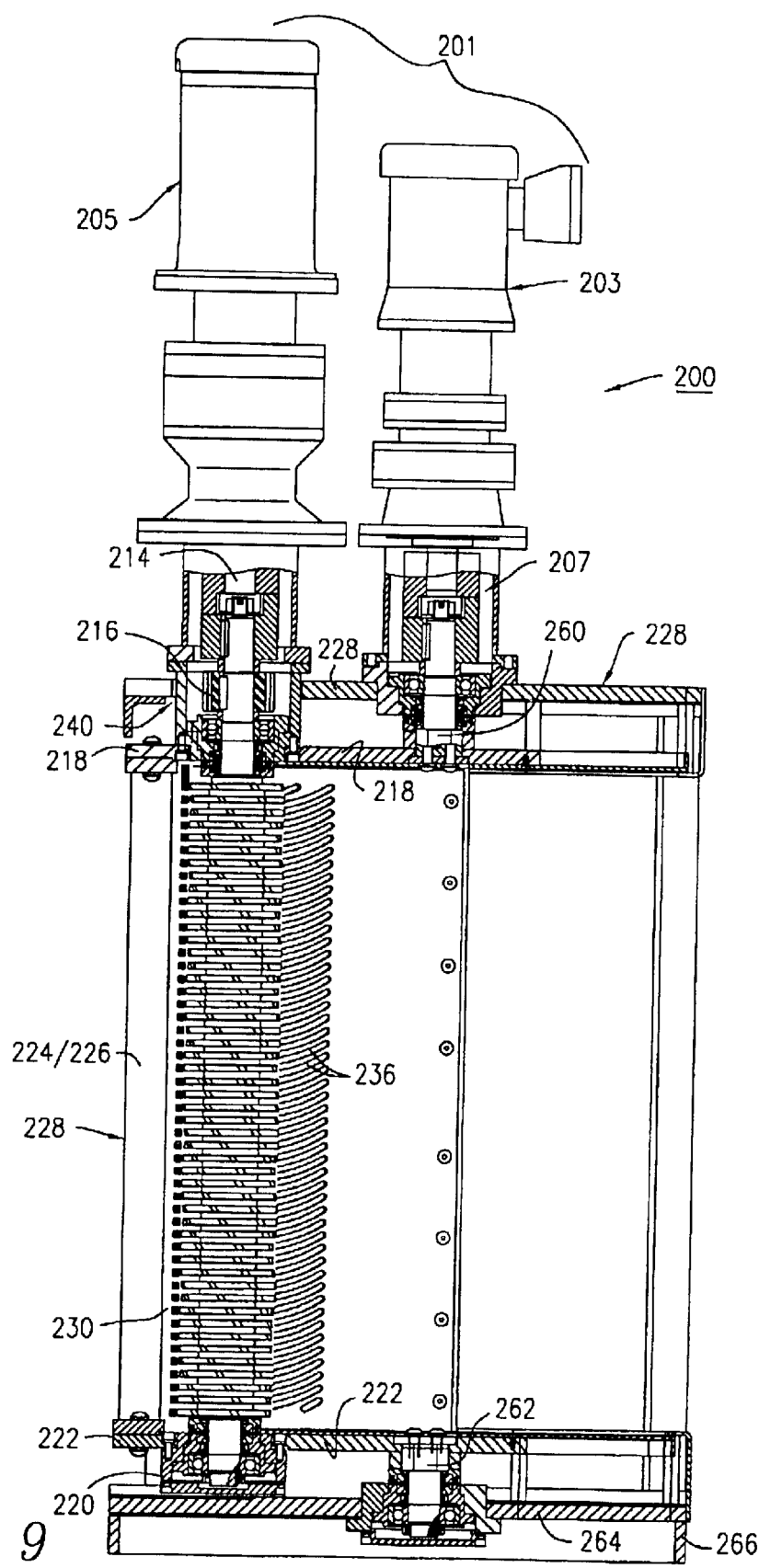
FIG. 9 is a partial longitudinal, cross-sectional view of the twin-shaft comminutor of FIG. 7.

As shown in FIGS. 7 to 9, the drive motor 205 operates the twin shaft grinder 214 by rotating a pair of parallel rotatable shafts 280, 282, which in turn rotate the pair of intermeshing grinder teeth members 284, 286 disposed on their respective rotatable twin shafts 280, 282. The twin shaft grinder 214 also includes an upper bearing device 216, having a pair of rounded ends 231a and 231b, and a lower bearing device 220, having a pair of rounded ends 233a and 233b. The rounded ends 231a, 231b, 233a and 233b for the upper and lower bearing devices 216 and 220, respectively, are used in order to maximize the travel of the intermeshing grinder teeth (grinder stacks) 284, 286 within the rectangularly shaped frame-like structure 228. The frame-like structure acts as a single unit (i.e., acts like a crankshaft) in order to maneuver the twin shaft grinder 214 along the arcuate path P adjacent to the screen member 230, as depicted in FIGS. 8 and 10. In summary, the main difference between the comminutors 10 and 200 is that, the comminutor 200 has the dual electric drive system 201 with the center oscillating drive motor 203 and the grinder electric drive motor 205 therein, whereas the comminutor 10 (see FIG. 1) has a single hydraulic/electric drive motor 12.

Figure 10:
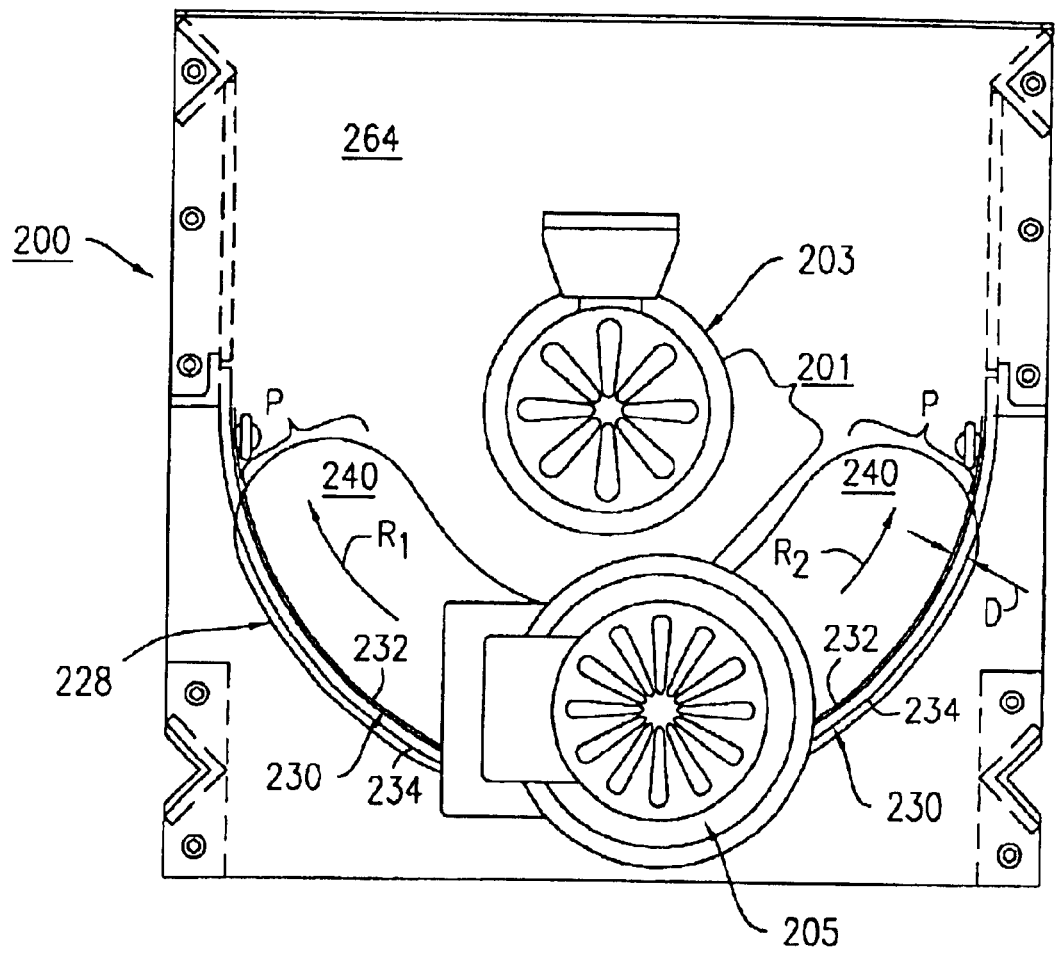
FIG. 10 is a top plan view of the twin-shaft comminutor of FIGS. 7–9.

In operation, as shown in FIGS. 8 and 10, when the grinder 214 reaches the end of its travel path, as indicated by the curved arrows $R_1$ and $R_2$, a control switch (not shown) or a timer (not shown) is used to stop the oscillating motor 203 in order to reverse the direction of oscillating motor 203. If the grinder 214 can not reach the end of its full travel because of an obstruction of some solid material particles 270 in the waste flow stream, a high current draw condition would inform the controller (not shown) to shut down the oscillating motor 203, after which a time function (not shown) would then reverse the direction of the oscillating motor 203. In all other aspects, the comminutor 200 operates in the exact same manner as the comminutor 10.

Fourth Exemplary Embodiment

Figure 11:
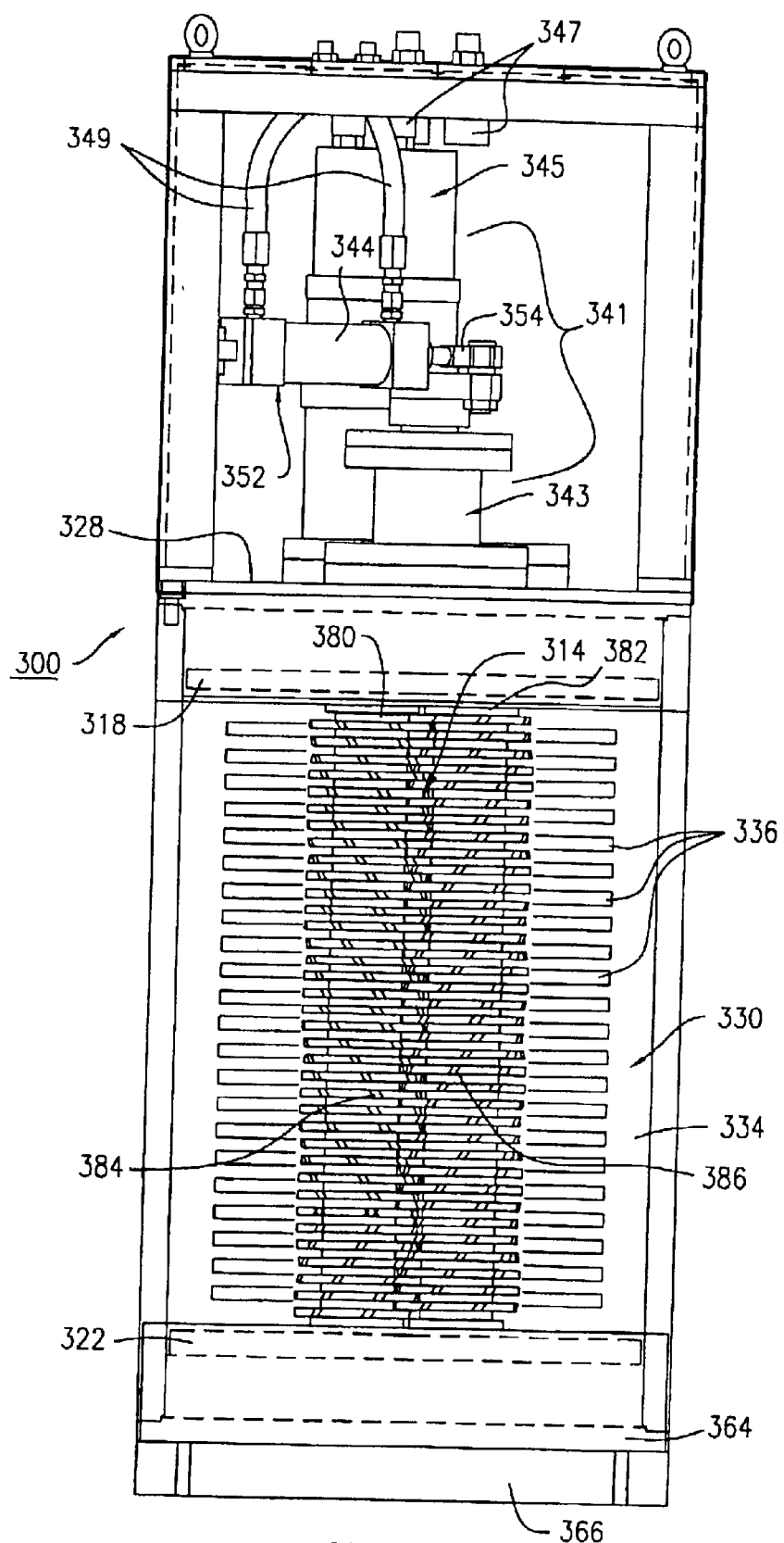
FIG. 11 is a front elevational view of a twin-shaft comminutor constructed in accordance with still another exemplary embodiment of the present invention.
Figure 12:
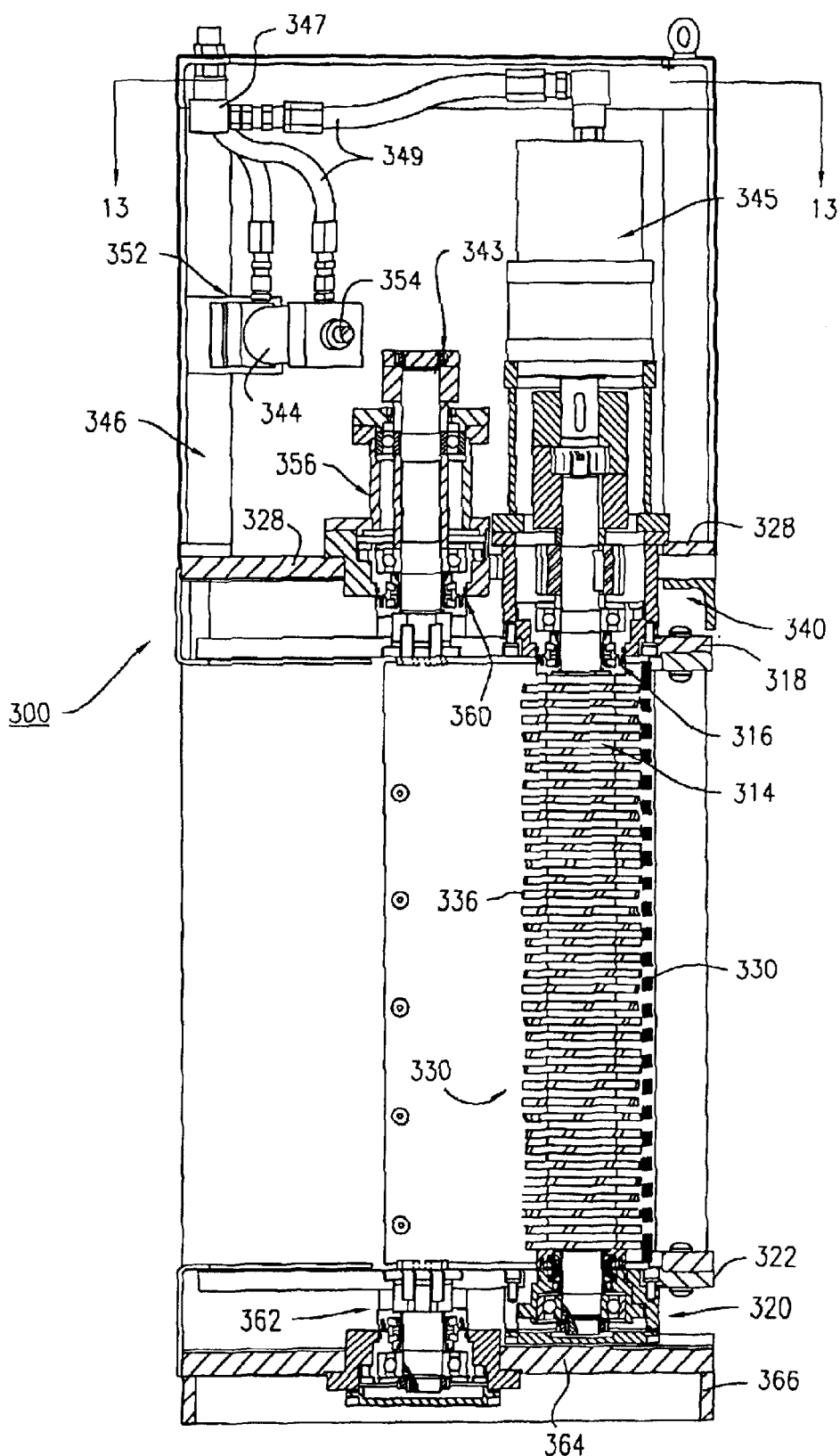
FIG. 12 is a partial, longitudinal cross-sectional view of the twin-shaft comminutor of FIG. 11.
Figure 13:
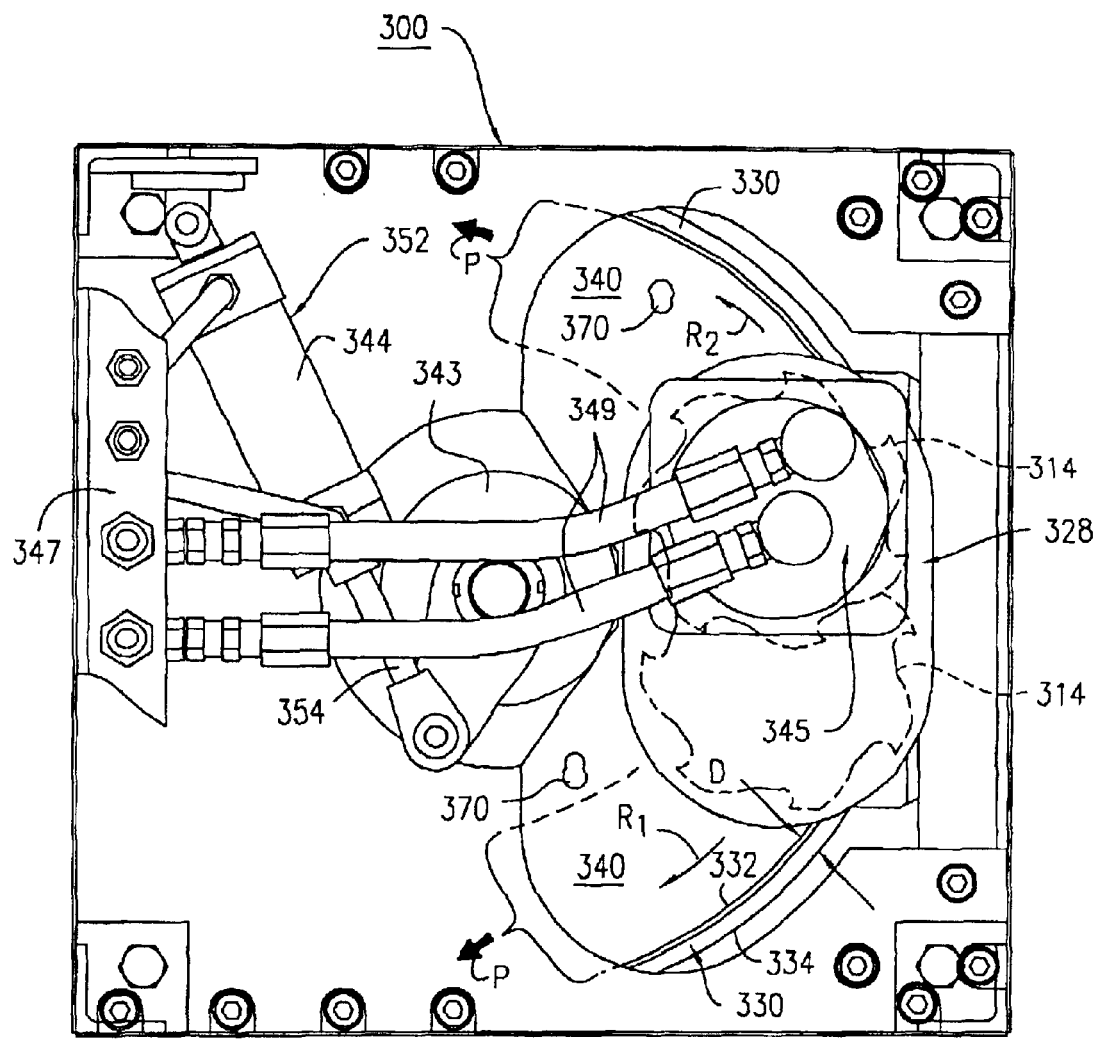
FIG. 13 is a cross-sectional view, taken along section line 13—13 and looking in the direction of the arrows, of the twin-shaft comminutor of FIG. 12.

A fourth exemplary embodiment of the present invention is illustrated in FIGS. 11 to 13. Elements illustrated in FIGS. 11 to 13 which correspond to the elements described above with reference to FIGS. 1 to 3 have been designated by corresponding reference numbers increased by three hundred. The embodiment of FIGS. 11 to 13 is constructed and operates in the same manner as the embodiment of FIGS. 1 to 3, unless it is otherwise stated.

The comminutor 300 includes an all hydraulically driven system 341 having an hydraulic travel cylinder 343 and an hydraulic torque motor 345. The hydraulic travel cylinder 343 provides the reciprocating motion to move the hydraulic torque motor 345 and the attached twin shaft grinder 314 along the arcuate path P at a spaced distance D adjacent to a concave upstream side surface 332 of screen member 330. The hydraulic torque motor 345 provides the rotational motion for the twin shaft grinder 314 for grinding and shredding of solid material particles 370 in the upstream liquid flow of the effluent stream. The hydraulically driven system 341 further includes a hydraulic manifold 347 having a plurality of hydraulic lines 349 connected to the hydraulic manifold 347, and to the hydraulic travel cylinder 343 and torque motor 345, respectively, for actuating those elements with hydraulic fluid from the hydraulic manifold 347 (see FIGS. 12 and 13). The hydraulic travel cylinder 343 uses a low pressure hydraulic system of 600 psig maximum, so as not to exert excessive force when traveling along the length of the arcuate path P of the screen member 330. Thus, the reversing of the travel cylinder 343 can be actuated when the pressure within the hydraulic lines 349 has increased to a level because the twin shaft grinder 314 has reached an unmovable point due to the end of its travel path or because of an obstruction on the screen member 330. The hydraulic torque motor 345 uses a high pressure hydraulic system of 2800 psig maximum to generate the torque needed for shredding and grinding the wastewater solid particles 370. In all other respects, the comminutor 300 is exactly the same as the comminutor 10. In summary, the main difference between the comminutors 10 and 300 is that the comminutor 300 has the all hydraulically driven system 341 with the hydraulic travel cylinder 343 and the hydraulic torque motor 345 therein, whereas the comminutor 10 (see FIG. 1) has only a single hydraulic drive motor 12.

In operation, as shown in FIG. 13, when the twin shaft grinder 314 reaches the end of its travel path, as indicated by the curved arrows $R_1$ and $R_2$, a control switch (not shown) or a timer (not shown) is used to stop the hydraulic travel cylinder 343 in order to reverse the direction of the travel cylinder 343. Also, if the grinder 314 can not reach the end of its full travel path because of an obstruction that jams the grinder 314, a high pressure condition would signal the control switch to reverse the control solenoids (not shown) which in turn causes the twin shaft grinder 314 repeatedly reverse its rotation (i.e., jog) in order to clear the obstruction. The control switch would simultaneously signal the hydraulic travel cylinder 343 to stop while the grinder 314 is in this jogging condition. In all other aspects, the comminutor 300 operates in the exact same manner as the comminutor 10.

Fifth Exemplary Embodiment

Figure 14:
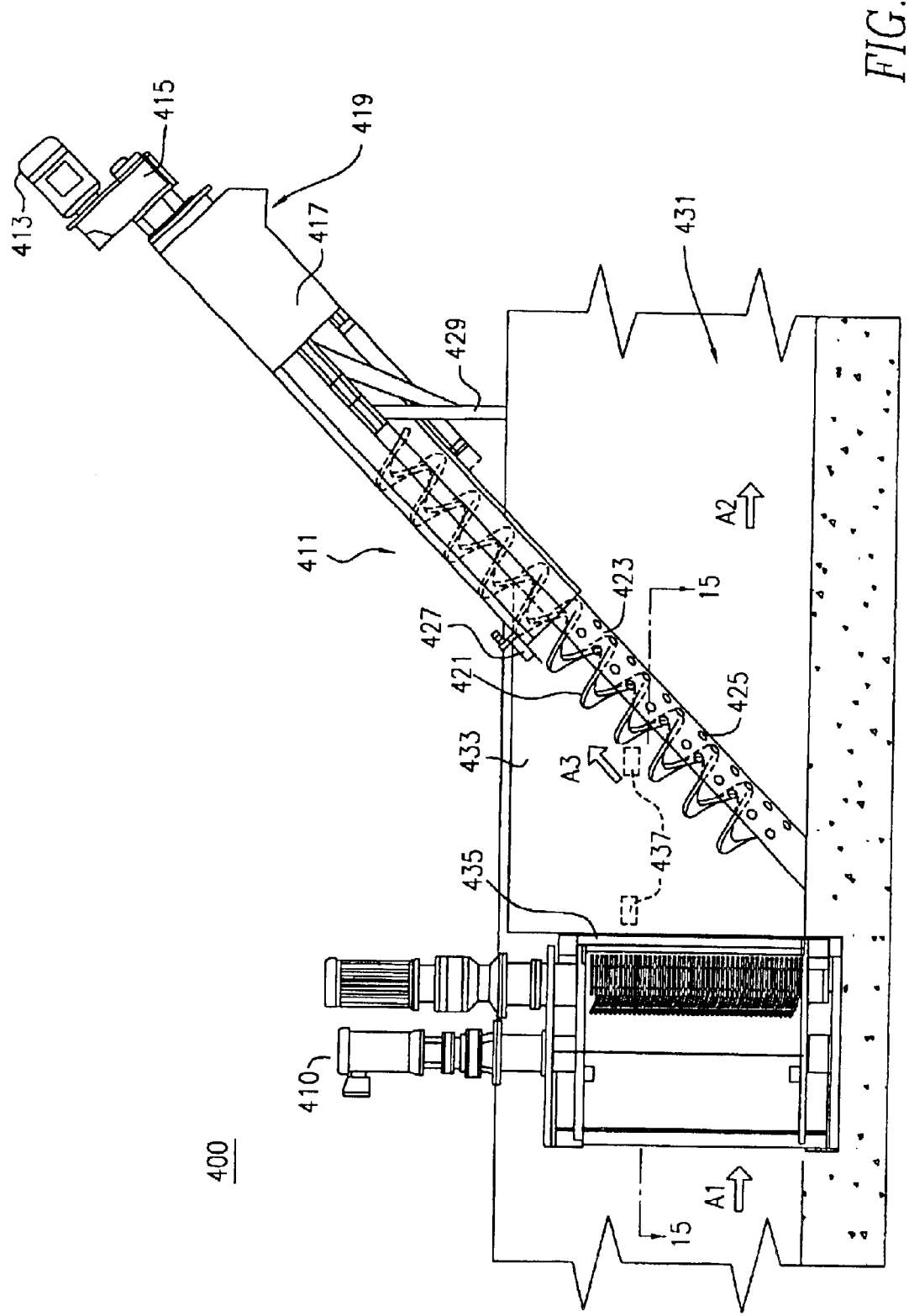
FIG. 14 is a partial cross-sectional view of a twin shaft comminutor constructed in accordance with still another exemplary embodiment of the present invention.
Figure 15:
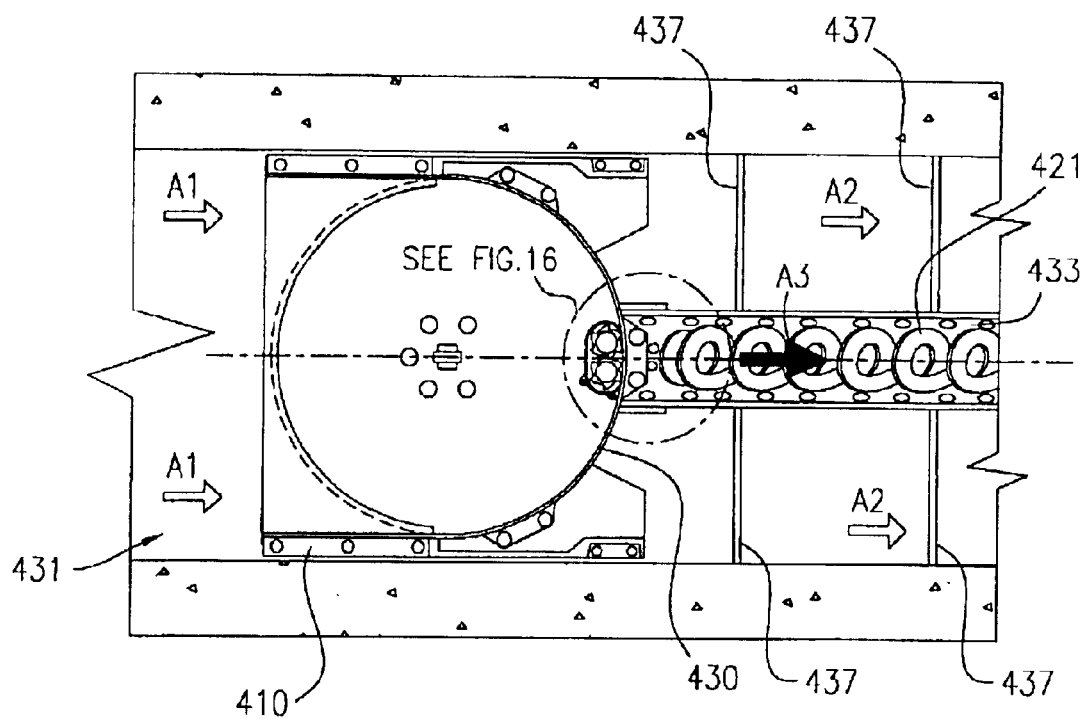
FIG. 15 is a cross-sectional view, taken along section line 15—15 of the twin shaft comminutor of FIG. 14.
Figure 16:
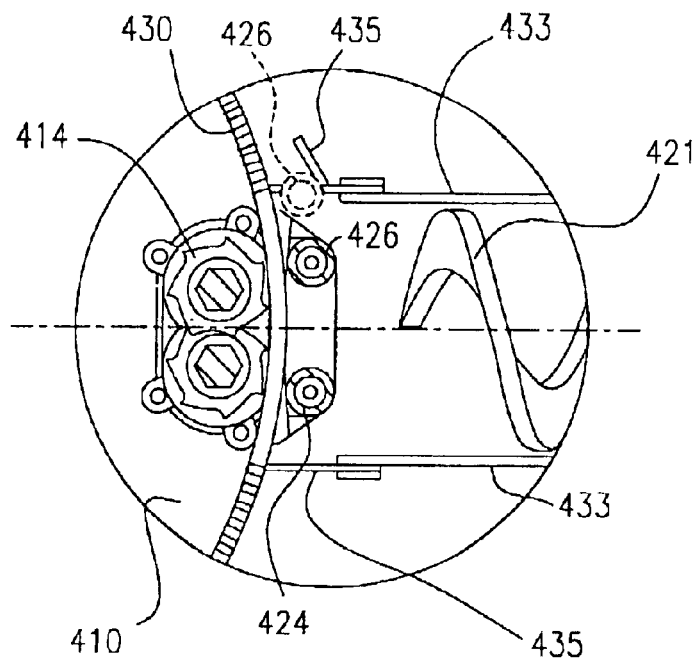
FIG. 16 is an enlarged view of a feature taken from the dashed circle of FIG. 15.

FIGS. 14 to 16 depict a fifth embodiment of the present invention. Elements illustrated in FIGS. 14 to 16 that correspond, either identically or substantially, to the elements described above with respect to the first embodiment of FIGS. 1 to 3 have been designated by corresponding reference numerals increased by four hundred. The embodiment of FIGS. 14 to 16 is constructed and operates in the same manner as the embodiment of FIGS. 1 to 3, unless it is otherwise stated.

Referring to FIGS. 14 to 16, a comminutor system 410 is shown which is the same as the comminutor 10, except for the addition of an auger screen assembly 411. The auger screen assembly 411 includes a motor 413 for powering the auger screen assembly 411. The motor 413 is connected to a hollow shaft reduction gearbox 415. The hollow shaft reduction gearbox 415 is affixed to a transport tube 417. A discharge chute 419 is disposed in the transport tube 417, which may be a cylindrical tube surrounding a portion of a shaftless screw auger 421. The transport tube 417 is affixed to a screen basket 423. The screen basket 423 is trough shaped and has a plurality of perforations 425 disposed within it. The screen basket 423 partially surrounds the shaftless screw auger 421, which is disposed within both the screen basket 423 and transport tube 417. The shaftless screw auger 421 is connected to the motor 413 through the gearbox 415. A spray nozzle 427 is affixed to the transport tube 417. Support brackets 429 are attached between the transport tube 417 and a channel 431.

Two divider plates 433 are located in the channel 431 and are mounted on each side of the screen basket 423. The divider plates 433 extend from the comminutor system 410 and run parallel to the downstream flow. A flexible seal member 435 is mounted along each vertical edge of each of the baffle plates adjacent to the screen 430. Within the channel 431 are a plurality of divider supports 437 that support the divider plates 433 and are affixed between the divider plates 433 and the channel 431.

During operation, the auger screen assembly 411 is positioned to convey effluent away from the downstream side of the comminutor system 410. The auger screen assembly 411 is mounted in a stationary position in the channel 431 and does not move. The divider plates 433 segregate "solid containing flow" from "clear flow" which bypasses the auger screen assembly 411. The flexible seal members 435 allow grinders 414 to move along their arc-like path unhindered by the divider plates 433. As represented in FIG. 16, a vertical support member 426, shown in phantom, is depicted moving past the flexible seal member 435. Solid materials that pass through the comminutor system 410 flow into the auger screen assembly 411 and are deposited on the shaftless screw auger 421. The direction of flow is indicated by the arrow A1. The shaftless screw auger 421 rotates in a direction that moves both solids and liquids up and away from grinders the 414 in the direction represented by arrow A3. Much of the liquid traveling through the effluent channel 431 flows past the auger screen assembly 411 separated by the divider plates 433, as represented by Arrow 2. Some liquid passing through the comminutor system 410 flows into the auger screen assembly 411. Liquid that travels into the auger screen assembly 411 passes through the perforations 425 in the screen basket 423 and into the downstream side of the effluent flow represented by arrow A2 of FIGS. 14 and 15. Spray nozzle 427 sprays water onto the solid materials deposited on the shaftless screw auger 421 to remove adhering organic debris from the solid materials as they move up the shaftless screw auger 421. The solid materials are transported up the shaftless screw auger 421 through the transport tube 417. The transport tube 417 prevents material transported by the shaftless screw auger 421 from falling out of the auger screen assembly 411 before reaching the discharge chute 417. After passing through the transport tube 417, the solid materials reach the discharge chute 419. The discharge chute 419 expels the solid materials from the auger screen assembly 411.

In conclusion, the advantage of the various exemplary embodiments of the present invention are summarized as follows. The rotatable turn-table (frame-like structure) with central supports provides for ease of sealing and securing the twin-shaft grinder through conventional means. The concave filtering screen member and the rectangularly-shaped frame structure have a smooth shape to prevent hang up of solid materials and promote complete processing and smooth fluid flow of the effluent stream. Further, the frame-like structure (in relationship to the filtering screen member) provides for support of the twin shaft grinder in a predetermined space distance to the upstream side surface of the screen member in order to generate a novel sweeping action. The unique design of these comminuting systems eliminates gaps within their internal structures (as explained in the prior art patents) which can cause incomplete processing by allowing solids to pass therethrough. Additionally, the simple and unique construction of the comminuting systems allows the liquid sewage being processed to flow therethrough with minimum hindrance. In addition, the filtering screen member, the screen sweeping device and the twin shaft grinder may operate in a variety of structural configurations (as shown in each of the embodiments (10, 100, 200, 300 and 400), and as such are more compatible for maximum (through-put of solids) performance than the prior art devices and systems. The directional clearing properties of the reciprocating grinders insures that solids which impact the filtering screen member can be swept aggressively from the upstream screen surface and redirected from the twin shaft grinder back into the flow path of effluent stream during each sweeping cycle of the grinder. Thus, it is possible to keep the filtering screen member clear of solids which enhances the performance and efficiency of the comminuting systems of the present invention. While use of a single drive means for moving and driving the various rotating component parts of any comminutor apparatus may be advantageous, the use of the novel screening and sweeping action in accordance with the present invention is the most important aspect when assessing whether one or more drive means are utilized.

It should be understood that the embodiments described herein are merely exemplary and that a person skilled in the art may make many variations and modifications without departing from the spirit and scope of the invention. For example, filtering screen 30 may be sized and shaped to have a flat and straight rectangular configuration, a U-shaped cylindrical configuration or a sinusoidal-shaped configuration. Another variation to all of the embodiments is that the travel path of the twin shaft grinder 14 may be an orbital motion instead of a reciprocating motion. A further variation to the embodiments is that the twin shaft grinder 14 may be aligned in an I-formation relative to and being perpendicular to the upstream side surface 32 of the filtering screen 30. In addition, the twin shaft grinder 14 can be replaced by a single shaft grinder or any other multi-shaft grinder. Further, any and all methods of powering such grinders, including but not limited to, electric, hydraulic, gear, chain, direct and indirect contact methods are also contemplated by this invention. All such variations and modifications are intended to be included within the scope of the invention as defined in the appended claims.

What is claimed is:

1. A comminutor apparatus, comprising screening means for screening and collecting solids carried by an effluent stream, said screening means having an upstream side and a downstream side; grinding means, operating independently of said screening means, for grinding solids contained in the effluent stream and for cleaning said screening means of solids collected thereon; mounting means for mounting said grinding means a spaced distance from said upstream side of said screening means; and moving means for moving said grinding means across said screening means.

2. A comminutor apparatus in accordance with claim 1, wherein said moving means moves said grinding means in a reciprocating fashion along a path adjacent to said upstream side of said screening means.

3. A comminuting apparatus in accordance with claim 2, wherein said screening means has an arcuate shape and said moving means moves said grinding means in an arcuate path substantially parallel to said screening means.

4. A comminutor apparatus in accordance with claim 1, wherein said grinding means is spaced apart from said screening means such that the movement of said grinding means relative to said screening means performs a sweeping motion for sweeping solids away from said screening means.

5. A comminutor apparatus in accordance with claim 4, wherein said grinding means recirculates solids which have been swept away from said screening means.

6. A comminutor apparatus in accordance with claim 1, wherein said screening means is a filtering screen having a plurality of openings therethrough.

7. A comminutor apparatus in accordance with claim 6, wherein said filtering screen has a flat rectangular shape.

8. A comminutor apparatus in accordance with claim 6, wherein said filtering screen has a semi-cylindrical shape.

9. A comminutor apparatus in accordance with claim 6, wherein said filtering screen has a U-shaped configuration.

10. A comminutor apparatus in accordance with claim 6, wherein said filtering screen has a sinusoidal-shaped configuration.

11. A comminutor apparatus in accordance with claim 6, wherein at least some of said openings have an elongated shape.

12. A comminutor apparatus in accordance with claim 6, wherein at least some of said openings have a circular shape.

13. A comminutor apparatus in accordance with claim 6, wherein at least some of said openings have a chevron-like shape.

14. A comminutor apparatus in accordance with claim 6, wherein at least some of said openings have a wave-like shape.

15. A comminutor apparatus in accordance with claim 6, wherein at least some of said openings have a curved shape.

16. A comminutor apparatus in accordance with claim 6, wherein at least some of said openings have a sinusoidal shape.

17. A comminutor apparatus in accordance with claim 1, wherein said moving means moves said grinding means in an orbital path.

18. A comminutor apparatus in accordance with claim 1, further comprising conveying means, mounted adjacent said downstream side of said screening means, for conveying solid matter away from said grinding means.

19. The comminutor apparatus of claim 18, wherein said conveying means includes an auger screen assembly.

20. A comminutor apparatus in accordance with claim 1, wherein said moving means includes an oscillating electric drive motor.

21. A comminutor apparatus in accordance with claim 1, wherein said moving means includes an oscillating hydraulic actuator.

22. A comminutor apparatus in accordance with claim 1, wherein said moving means includes an hydraulic travel cylinder.

* * * * *